United States Patent [19]

Mittal et al.

[11] Patent Number: 6,093,432
[45] Date of Patent: Jul. 25, 2000

[54] METHOD AND APPARATUS FOR ELECTRICALLY TREATING FOODSTUFFS FOR PRESERVATION

[75] Inventors: Gauri Shankar Mittal, Guelph; Shirley Yuet Wa Ho, Toronto; James D. Cross, Waterloo; Mansel W. Griffiths, Rockwood, all of Canada

[73] Assignee: University of Guelph, Guelph, Canada

[21] Appl. No.: 09/133,368

[22] Filed: Aug. 13, 1998

[51] Int. Cl.[7] .................................................. A23C 3/00
[52] U.S. Cl. ........................... 426/237; 426/521; 422/21; 422/22; 422/186.04; 99/451
[58] Field of Search ............... 99/451; 426/521, 426/237; 422/21, 22, 186.04

[56] References Cited

U.S. PATENT DOCUMENTS

| | | |
|---|---|---|
| 4,457,221 | 7/1984 | Geren . |
| 4,524,079 | 6/1985 | Hofmann . |
| 4,572,775 | 2/1986 | Paniagua . |
| 4,612,199 | 9/1986 | Miyahara . |
| 4,695,472 | 9/1987 | Dunn et al. . |
| 4,838,154 | 6/1989 | Dunn et al. . |
| 4,871,559 | 10/1989 | Dunn et al. . |
| 5,048,404 | 9/1991 | Bushnell et al. . |
| 5,235,905 | 8/1993 | Bushnell et al. . |
| 5,282,940 | 2/1994 | Griffis et al. .............................. 204/131 |
| 5,447,733 | 9/1995 | Bushnell et al. . |
| 5,514,391 | 5/1996 | Bushnell et al. ......................... 426/237 |
| 5,549,041 | 8/1996 | Zhang et al. . |
| 5,571,550 | 11/1996 | Polny, Jr. ................................. 426/244 |
| 5,662,031 | 9/1997 | Qin et al. . |
| 5,690,978 | 11/1997 | Yin et al. ................................. 426/237 |
| 5,758,015 | 5/1998 | Polny, Jr. ................................. 392/318 |
| 5,776,529 | 7/1998 | Qin et al. ................................. 426/231 |

OTHER PUBLICATIONS

Inactivation of Pseudomonas fluorescens by High Voltage Electric Pulses, Ho et al, Journal of Food Science, vol. 60, No. 6, 1995.

Destruction and Inhibition of Bacterial Spores by High Voltage Pulsed Electric Field, Journal of Food Science, vol. 62, No. 2, 1997.

Effects of High Field Electric Pulses on the Activity of Selected Enzymes, Journal of Food Engineering 31, 1997, 69–84.

*Primary Examiner*—Nina Bhat
*Attorney, Agent, or Firm*—Lynn C. Schumacher; Nancy E. Hill; Hill & Schumacher

[57] ABSTRACT

A method and apparatus for electrically treating foodstuffs flowing through a treatment chamber with low energy, high voltage electrical pulses for non-thermal pasteurization and/or sterilization. Instant-charge-reversal electrical pulses are applied to a foodstuff located between two electrodes in a treatment chamber, each electrical pulse having a pulse width in a range from about 1 to 5 μs with vertically rising voltage to a peak followed immediately with a decreasing voltage through zero volts and continuing to a voltage peak of opposite polarity and rising vertically back to zero volts. The electrical pulses are very low energy (0.1–25 Joules/pulse) and the field strengths are in the range 15 kVolts/cm to 120 kVolts/cm. This instant-charge-reversal electrical pulse is shown to have a much greater microbial killing power compared to other pulse waveforms used to treat foodstuff. The apparatus uses an electrode arrangement including a cylindrical inner electrode and an annular disc with the cylindrical electrode inserted through the hole in the disc.

25 Claims, 15 Drawing Sheets

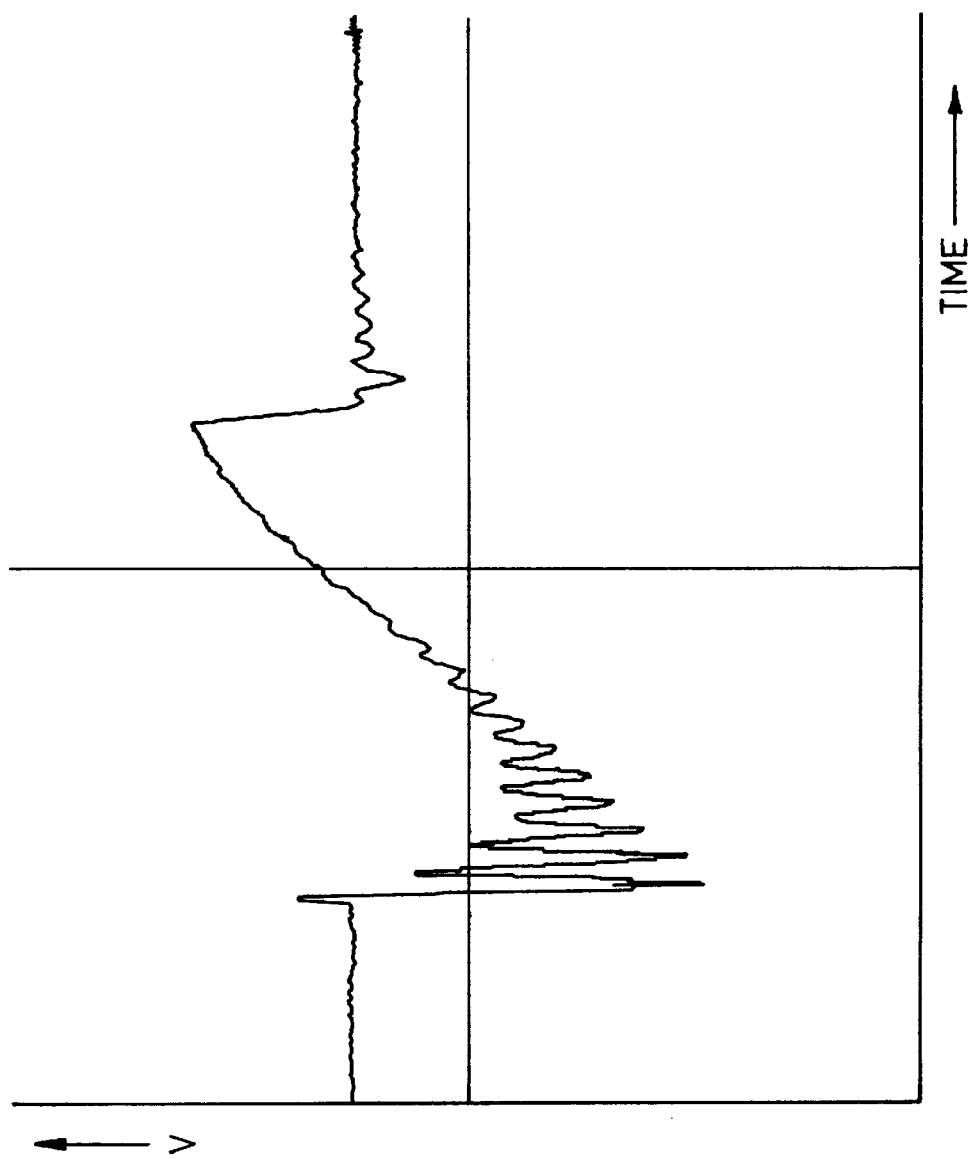

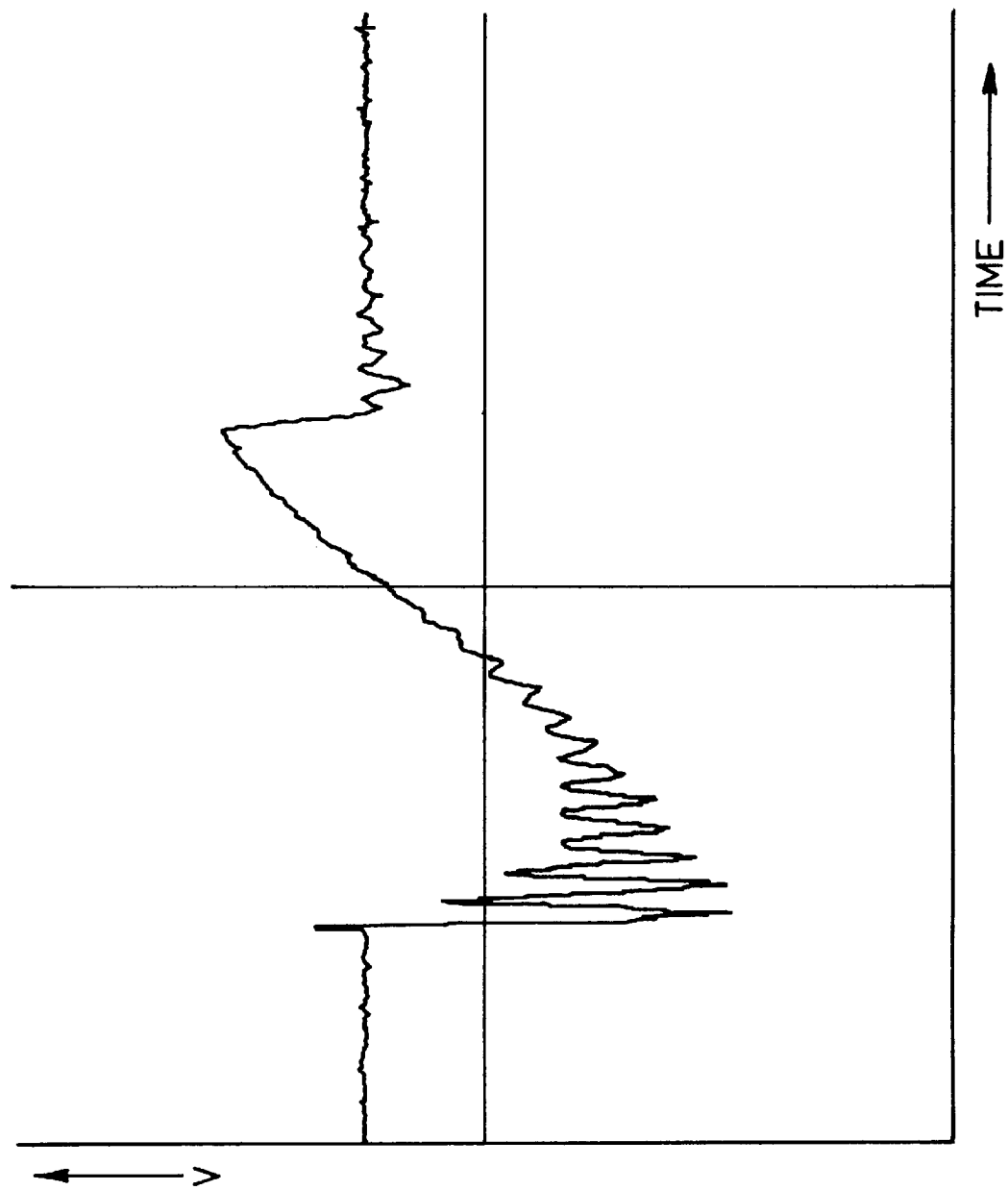

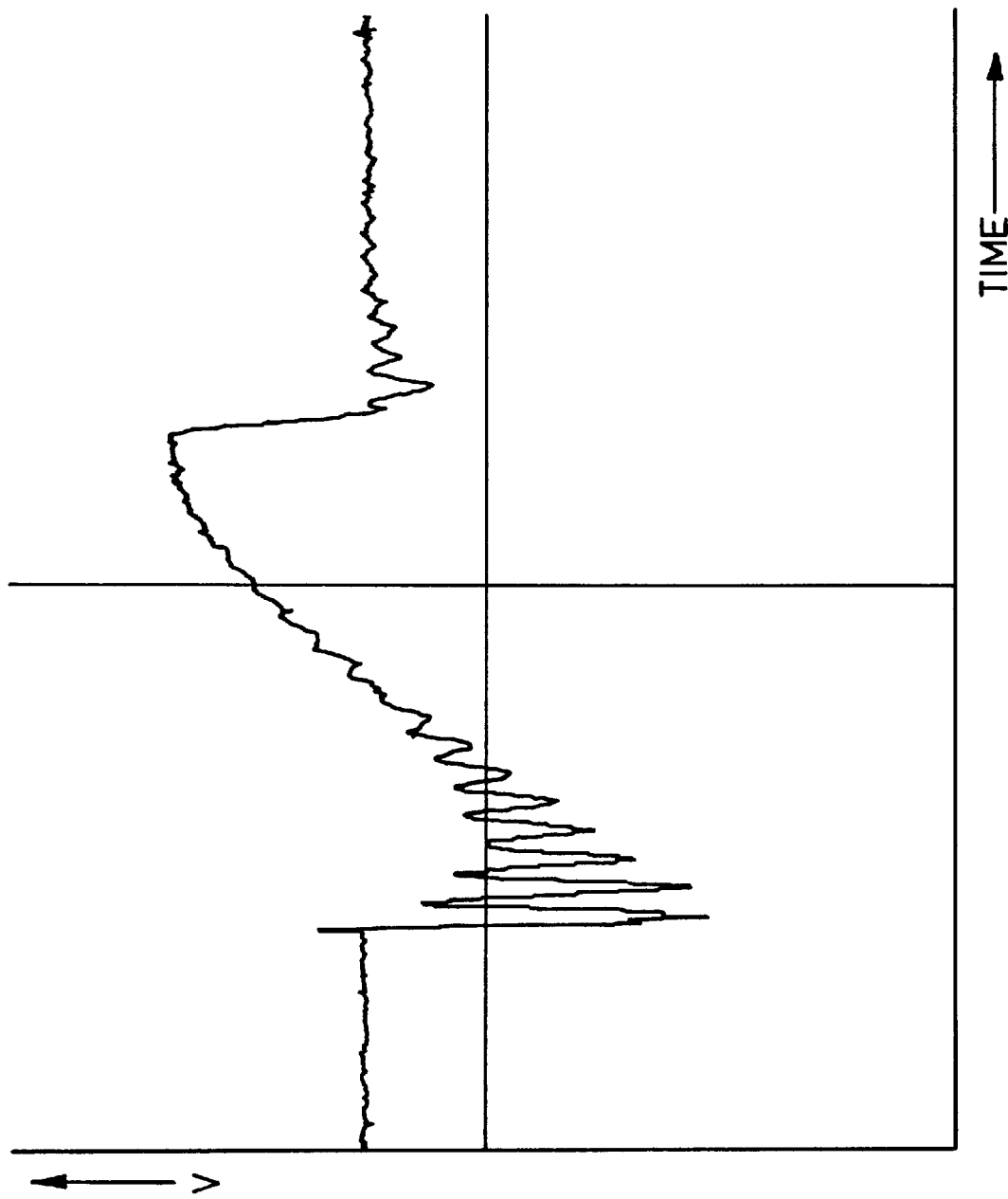

METHOD AND APPARATUS FOR ELECTRICALLY TREATING FOODSTUFFS FOR PRESERVATION

FIELD OF THE INVENTION

The present invention relates to a method and apparatus for electrically treating foodstuffs, and more particularly the invention relates to treating foodstuffs with low energy, high voltage electrical pulses for non-thermal pasteurization and/or sterilization.

BACKGROUND OF THE INVENTION

At present, foods are preserved commercially by thermal processing including ultra high temperature (UHT) or high temperature short time (HTST) processes. Extending shelf life of foods by heat treatment is not only energy intensive but in most cases, adversely affects the flavour (burned, cooked and scorched), chemical composition (organoleptic properties) and nutritional quality (vitamins) of treated foods. High-voltage pulsed electrical field treatment is currently being explored as an alternative and is the most promising technology under development as a non-thermal process to substitute for food additives or energy intensive thermal preservation methods. This also minimizes the loss of natural vitamins and flavours. The big advantage is the energy saving of the process.

The feasibility of using high voltage electric pulses for pasteurization of food has been investigated by researchers in Canada, USA, and Japan. Experimental studies have shown that pulsed electric fields can induce moderate to significant microbial inactivation in various aqueous solutions (Sato et al., 1994; Bushnell et al., 1991, 1993, 1995a,b; Zhang et al., 1994a, 1994b, 1994c, 1995b; Qin et al., 1995; Ho et al., 1995; Marquez et al., 1997, Jayaram et al., 1992; Gupta and Murray, 1989). The application of high voltage electric pulses to pasteurize liquid food products is thought to be a non-thermal and energy efficient process as compared to traditional thermal pasteurization. Moreover, researchers have found evidence that the same technology can be applied to other areas such as enzyme inactivation, product yield improvements, and semisolid/particulate/solid foods pasteurization (Vega-Mercado et al., 1995; Ho et al., 1997).

Pulsed power refers to the general technology of accumulating energy on a relatively long time scale (pulse charging, slow systems) and then compressing that energy in time and space to deliver large power pulses (pulse discharging, high speed systems) to a desired load. These pulses may last anywhere from hundreds of picoseconds to tens of seconds. Most of the studies in the past have been conducted using small-scale, batch mode treatment systems. Furthermore, only a few studies have treated real food products on a pilot-scale, continuous flow operation. The process parameters used for batch processing have had a very wide range: d.c. voltage: 2.5 to 43 kV; electric field strength: 0.6 to 100 kV/cm; electrode distance: 3 to 77 mm; pulse width: 1 $\mu$s to 10 ms; pulse frequency: 0.2 to 50 Hz; number of applied pulses: 1 to 120; and process volume: 0.5 mL to 1.6 L. Properties of the suspending media (electrical conductivity, pH, and compositions), process temperature, and microbiological conditions were sometimes not reported by the researchers. Based on all the available studies, the microbial reduction rate was found to range from a moderate 1–3 log cycles to a significant 6–9 log cycles, and seemed to be a function of various process parameters, conditions, and procedures.

Dunn and Pearlman (1987, 1989) patented a horizontal continuous flow system. The treatment chamber had multiple electrode zones which were electrically isolated from each other by insulation. The electrodes were separated from the fluid food by an ion membrane and electrolyte. A continuous potential was applied to each electrode. Thus, the fluid that flowed through the chamber would experience pulsed treatments at specific zones. They depicted the need to use pre-heat treatment as an aid. Experimental results were not reported. Although the concept is unique and the treatment time (flow rate) can be easily controlled, the chamber is somewhat bulky to operate and the energy savings are limited as high voltage is constantly supplied to the unit, and high energy pulses were used.

Bushnell et al. (1993) also patented a horizontal continuous flow system similar to that of as Sato et al. (1994). The high voltage inner electrode was held in position by a metallic connecting rod (to the pulser) which was surrounded by insulation. The inner electrode had tapered surfaces at both ends to minimize eddying or flow stagnation. The sample entered from the top (side hole of outer electrode) and came out from the middle of the pipe. They identified the need to use pre-heat treatment as an aid. Experimental results were not reported. Again, the chamber is bulky in configuration, and the existence of low electric field regions may hinder proper microbial control.

Qin et al.,1995 and Zhang et al., 1995a disclosed two chambers for continuous processing. The first one is a parallel plate chamber based on their batch chamber. The sample flows through the horizontal test chamber in a series of U-shaped channels. The electrode gap is 0.51 or 0.95 cm giving a volume of 8 or 20 mL. The operational parameters were 35 to 70 kV/cm, 2 to 15 $\mu$s pulse width, 1 Hz pulse frequency, and a flow rate of 0.6 to 1.2 L/min. Circulation of water around the circular stainless steel electrodes through jackets was implemented for cooling purposes due to the use of high energy pulses. The electric field strength and flow profile may be difficult to monitor with the use of U-shaped channels. The second one was a coaxial treatment chamber. They analyzed the chamber designed by Bushnell et al. (1993) and determined several local field enhancement points (Zhang et al. 1996). They then used an electric field optimization technique based on finite element method to modify the assembly by changing the electrode gap along the chamber. The operation parameters were 50 to 80 kV/cm, 2 to 6 mm electrode distance along the chamber, 2 to 15 $\mu$s pulse width, 1 Hz pulse frequency, and a flow rate of 2 to 10 L/min. Cooling jackets were attached to both electrodes to remove additional energy supplied by high energy pulses.

For the coaxial chamber continuous system, Qin et al. (1995) reported a reduction of 7 log cycles in simulated milk ultrafiltrate inoculated with an initial count of 8×10$^8$ cfu/mL E. coli. A 6–7 log cycle reduction was also obtained with commercial apple juice inoculated with a Saccharomyces. The process parameters used were exponential decay pulses, 50 kV/cm electric field strength, :2.5 $\mu$s pulse width, 1 Hz pulse frequency, 0.6 cm electrode gap (30 mL volume), and 2 pulses applied to the food. Treatment temperature was controlled between 22 to 34° C. Flow rates were not reported. Vega-Marcado et al. (1996) inoculated pea soup (semi-liquid) with E. coli and B. subtilis separately at 1×10$^7$ cfu/mL, and obtained a maximum reduction of 6.9 log cycles for E. coli and 5.25 log cycles for B. subtilis using 33 kV/cm electric field strength, 0.5 L/min flow rate at 4.3 Hz pulse frequency (30 pulses), and 55° C. treatment temperature. Zhang et al. (1994a, 1994b) inoculated a pure culture of S. cerevisiae in commercial apple juice (not cider), and obtained a microbial reduction from an initial 10$^7$ cfu/mL to a final $10^3$ cfu/mL. The conditions were 12 kV/cm for 20 pulses. The energy requirement was 260 J/pulse or 208 J/mL for a 25 mL batch. An auxiliary cooling system was also required to maintain a 4° C. process temperature. Physical and chemical property measurements were not reported.

Yin et al. 1997 have also reported studies on continuous treatments using a so-called "co-field flow" model treatment chamber, where the flow direction of the liquid medium was parallel to electric field. However, details on the treatment systems and process conditions were not clearly specified.

Previous inventors used high energy pulses and equipment to generate these. There are various problems with high energy pulses. These pulse generators are generally very costly due to the need to generate and control high energy pulses. In some systems, generally there is no energy saving, and sometimes higher energy is needed to treat foods compared to conventional thermal methods. Since large energy is applied to food, extra energy is required to be removed in order to control food temperature. In some cases, process temperature should be at least 45° C. for successful pasteurization. Such devices are bulky due to insulation requirements, as well as special electrical installation is needed due to larger power requirements. There are some problems with fouling of electrodes when foods containing proteins are treated. Electrode erosion, electrolysis of food, and breakdown of food generally occur due to high energy content of pulses.

When using high energy pulses, it is difficult to treat foods with high electrical conductivity as high current generated will create electrical breakdown of food. There is therefore a great need for a non-thermal and low energy per pulse electrical method for inactivating microorganisms that can be broadly applied to foodstuffs with varying conductivities that is economical, compact, energy efficient, safe, environmentally acceptable, and which does not significantly affect nutrition, texture and flavour of the treated food.

SUMMARY OF THE INVENTION

It is an object of the present invention to provide a rapid, economical method of electrically treating foodstuffs to kill microbial agents that eliminates the need to thermally pasteurize the food.

It is also an object of the present invention to provide a method of electrically treating foodstuffs that uses low energy to avoid electrolysis of the foodstuff and other forms of degradation associated with applying high levels of electrical energy to the food.

In one aspect of the invention there is provided a method for electrically treating foodstuffs, comprising positioning a foodstuff between at least two electrodes; and applying electrical pulses to the foodstuff located between the at least two electrodes, each electrical pulse having a waveform comprising a voltage amplitude rapidly changing magnitude from a preselected voltage level to a first voltage peak on one side of the preselected voltage level followed immediately thereafter by a voltage amplitude returning to the preselected voltage level and continuing to a second voltage peak on the other side of the preselected voltage level followed thereafter by the magnitude of the voltage amplitude returning substantially back to the preselected voltage level.

In this aspect of the invention the preselected voltage level may be substantially zero volts wherein the first voltage peak of one polarity and the second voltage peak is of opposite polarity to the first voltage peak.

In this aspect of the invention the electrical pulses may have a pulse width in a range from about 1 to about 5 μsec and each electric pulse may have a pulse energy in a range from about 0.1 to about 25 Joules.

In another aspect of the invention there is provided an apparatus for electrically treating foodstuffs, comprising:

a) a chamber comprising an inlet conduit, an outlet conduit, a first electrode and a second electrode spaced from the first electrode for making electrical contact with a foodstuff located in the chamber between the first and second electrodes;

b) pulse generator means for applying electrical pulses to one of the electrodes to provide an electric field between the electrodes through a foodstuff located therebetween in the chamber, the electrical pulses having a waveform comprising a voltage amplitude rapidly changing magnitude from a preselected voltage level to a first voltage peak on one side of the voltage level followed immediately thereafter by a voltage amplitude returning to the preselected voltage level and continuing to a second voltage peak on the other side of the preselected voltage level and thereafter returning substantially back to the preselected voltage level; and c) pump means for pumping a foodstuff through the inlet conduit and through the chamber.

In another aspect of the invention there is provided a method for generating low-energy high-voltage instant-charge-reversal pulses, comprising:

a) raising an a.c. line voltage through a step-up transformer, and then rectifying the stepped up voltage to produce a low voltage d.c. voltage which charges up the low voltage pulse capacitor ($C_1$) through an electrolytic capacitor bank ($C_0$) and an inductor ($L_1$); and b) discharging the low voltage capacitor bank through a thyristor and then raising the voltage through a high voltage pulse transformer to charge up a high voltage capacitor ($C_2$), discharging the high voltage capacitor through a thyratron to produce a pulsed electrical field between output electrodes connected to the thyratron.

BRIEF DESCRIPTION OF THE DRAWINGS

The method and apparatus for electrically treating foodstuffs in accordance with the present invention will now be described, by way of example only, reference being had to the accompanying drawings, in which:

FIG. 2b is an end view of the food treatment chamber of FIG. 2a;

FIG. 4 shows a voltage versus time trace of a pulse waveform measured across a treatment chamber containing orange juice in the treatment system at 15 kV voltage supply and 3 mm electrode gap (scale: vertical 2 kV/division, horizontal 500 ns/division), the voltage was measured at load on the high voltage electrode of the chamber;

FIG. 5 shows a voltage versus time trace of a pulse waveform measured across the chamber containing apple cider in the treatment system at 15 kV voltage supply and 3 mm electrode gap (scale: vertical 2 kV/division, horizontal 500 ns/division), the voltage was measured at load on the high voltage electrode of the chamber;

FIG. 6 shows a voltage versus time trace of a pulse waveform measured across the chamber containing waste brine in the treatment system at 15 kV voltage supply and 3 mm electrode gap (scale: vertical 2 kV/division, horizontal 500 ns/division), the voltage was measured at load on the high voltage electrode of the chamber;

DETAILED DESCRIPTION OF THE INVENTION CONTINUOUS TREATMENT SYSTEM

Figure 1:
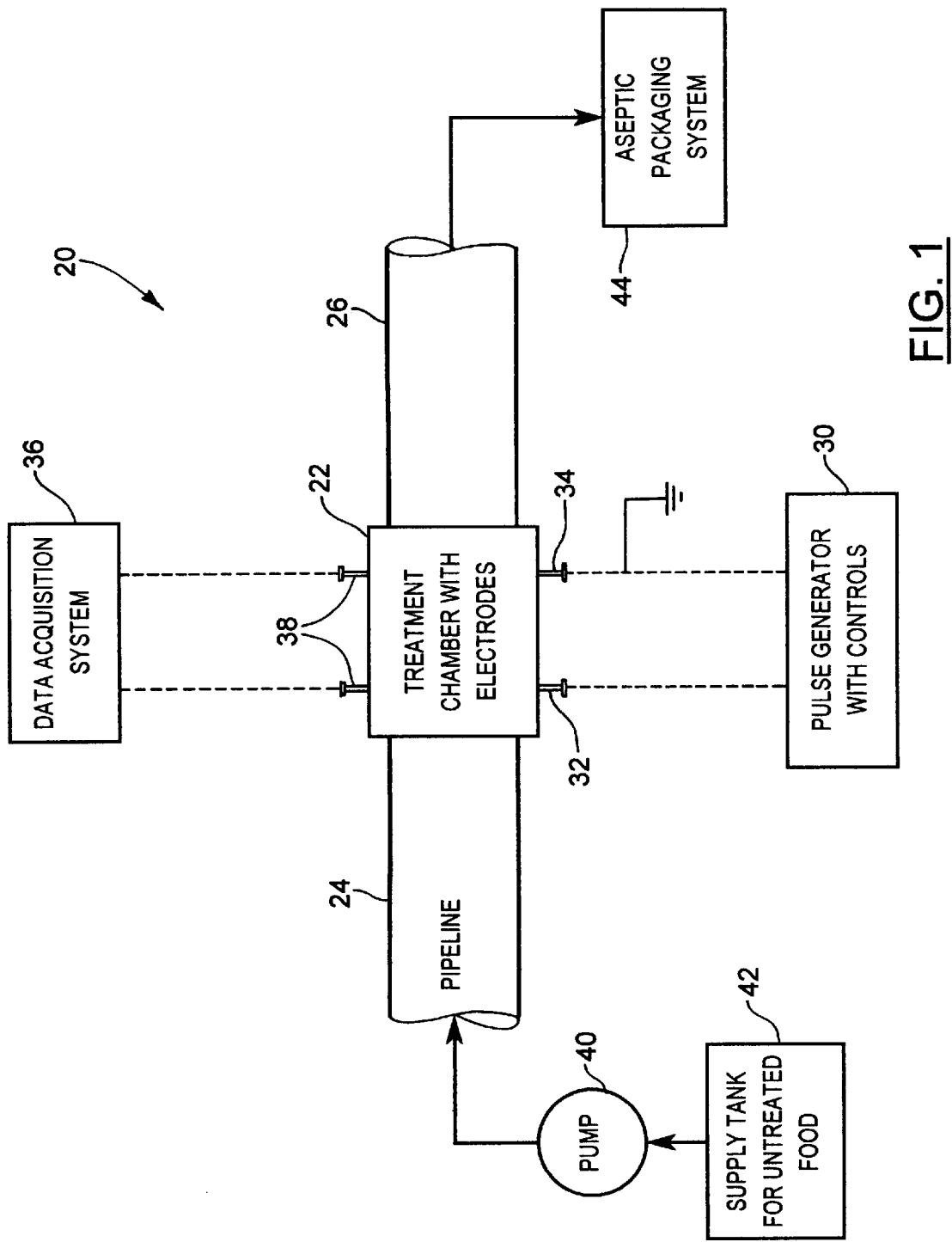
FIG. 1 is a block diagram of an apparatus for electrically treating foodstuffs according to the present invention.

Referring first to FIG. 1 there is shown a pulsed power treatment system 20 for processing fluid (liquid, semi-liquid) products in continuous mode using pulsed electric fields. Treatment apparatus 20 includes a treatment chamber 22 with inlet conduit 24 and outlet conduit 26. Contained within chamber 22 are a pair of electrodes (not shown) externally connected to a pulse generator 30 via cables 32 and 34 with one electrode being grounded. A data aquisition system 36 is connected to the electrodes via wires 38 for recording the treatment parameters such as pulse shape and amplitude, pulse width, pulse frequency, flow rates and the like for compliance with process verification and approval by the regulatory agencies. A pump 40 pumps the foodstuff from a supply tank 42 through inlet conduit 24, between the spaced electrodes in treatment chamber 22 and outlet conduit 26 at the desired flow rate during operation. An aseptic packaging system 44 is located at the exit of outlet conduit 26.

The treatment chamber 22 may be retrofitted into an existing pipeline of a food processing plant which uses conventional thermal processing. This will require a minor change in the existing system. A degassing system may also be incorporated in the treatment system before treatment chamber for removing air bubbles present in the food.

Figure 2A:
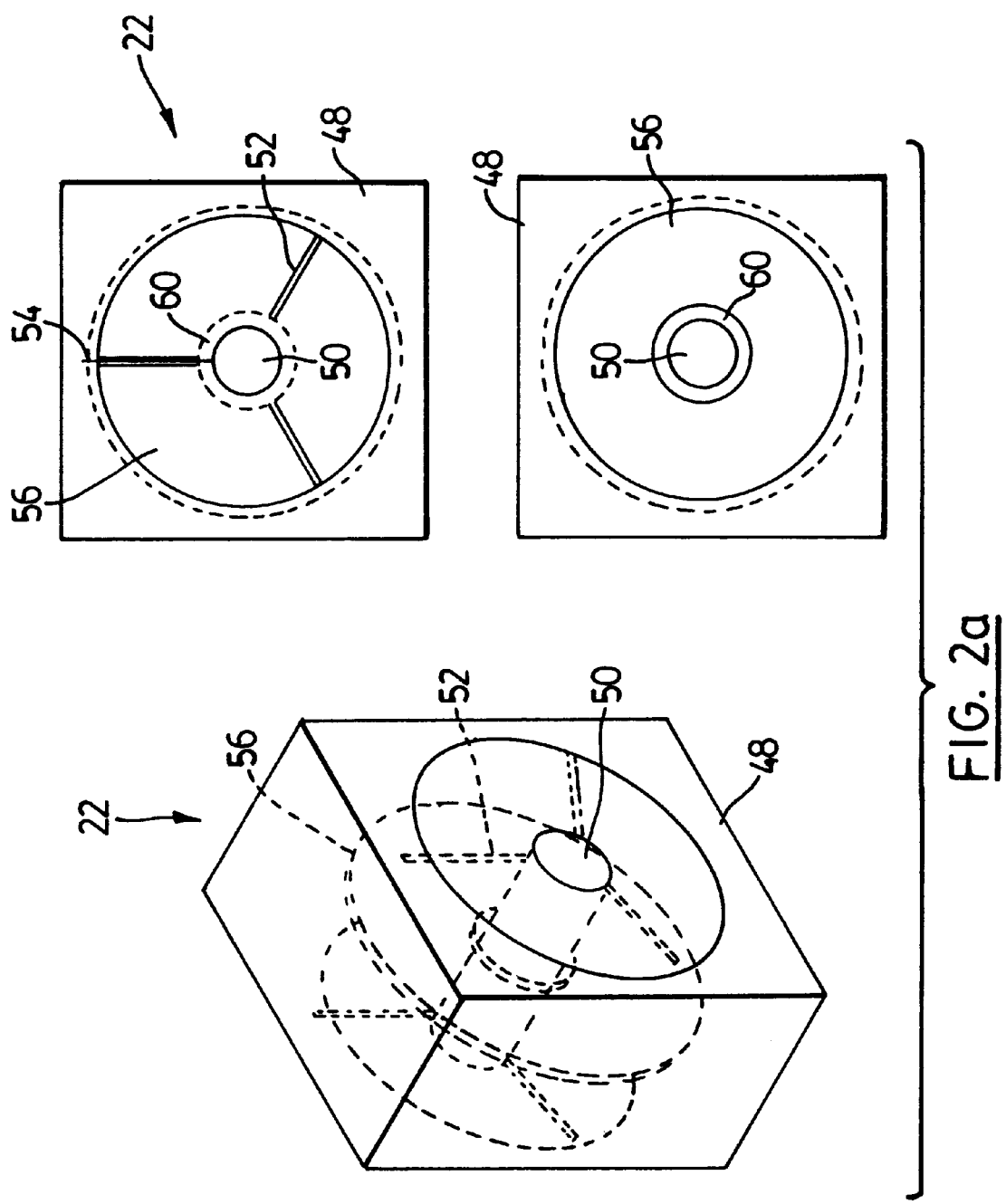
FIG. 2a is perspective view of a food treatment chamber assembly.
Figure 2B:
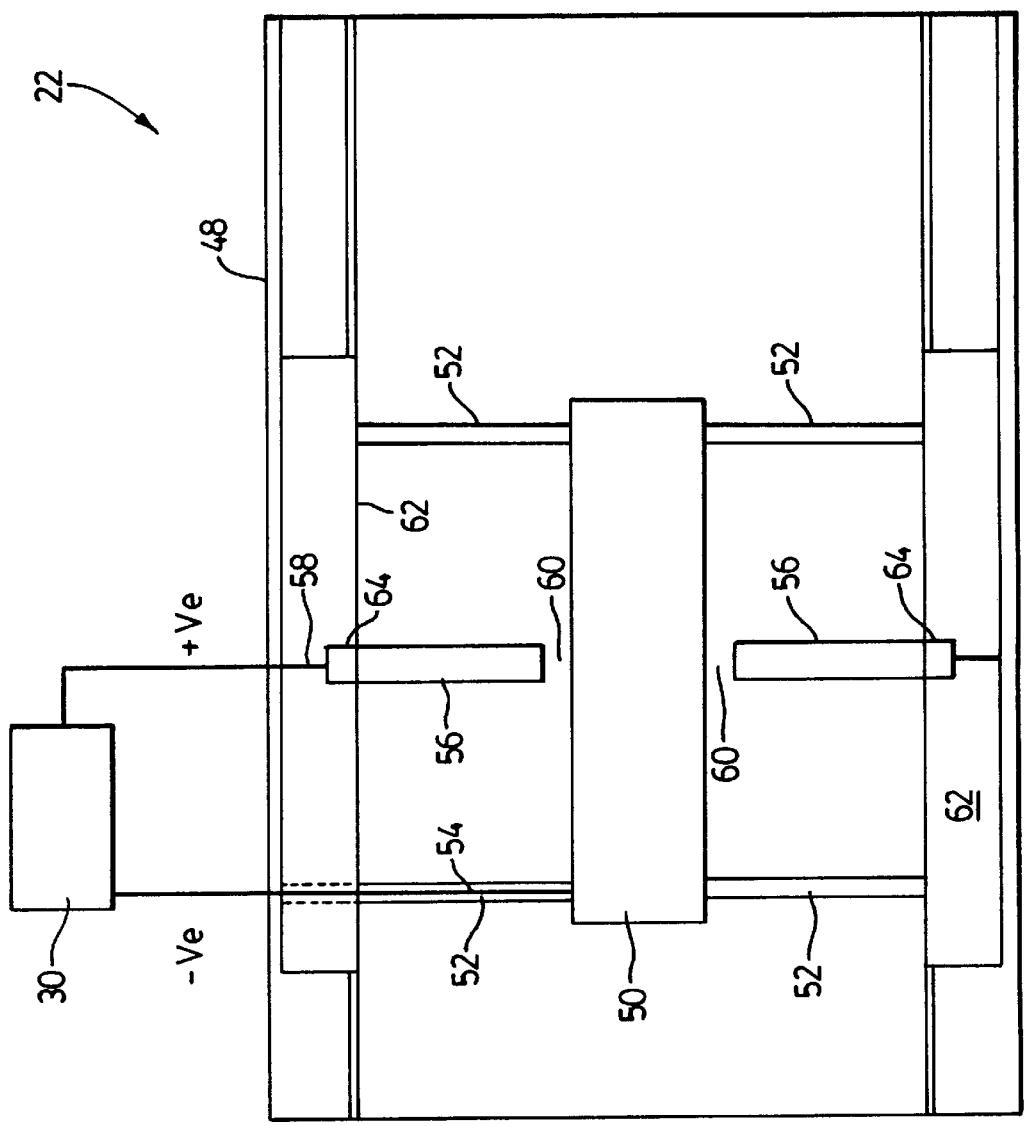

Referring to FIGS. 2a and 2b, treatment chamber 22 is a coaxial treatment chamber with an outer housing 48 containing therein an inner electrode 50 comprising a metal pipe of circular cross section with closed, rounded ends. Inner electrode 50 is held in place by three sets of insulated support legs 52 located at each end of the pipe (120° apart at each end) to allow fluid to flow in between. Inner electrode 50 is grounded by a wire 54 located in one of the legs 52 being electrically connected to the inner electrode. An outer electrode 56 comprising an annular disc with a hole through the middle is disposed about the inner electrode 50 midway along the length the inner electrode. A wire 58 connects outer electrode 56 to the pulse generator 30.

The inner diameter of outer electrode 56 may be varied to give a gap 60 between the outer diameter of electrode 50 and inner diameter of electrode 56. The food to be treated is pumped through gap 60 and as it passes through the gap it is subjected to the desired number of pulses for treatment. The gap 60 is preferably in the range between 0.1 cm to 1.0 cm depending on the foodstuff being treated. For foodstuffs of differing constituency different gaps may be used with larger gaps being preferred for more viscous food. The outer electrode disc 56 is held in place by being inserted into an insulator block 62 bearing against outer housing 48 with insulator 62 being a circular pipe which slides into housing 48. The interface 64 between the electrode/insulation is in tight contact to minimize sparking between the electrodes. The treatment chamber 22 can be readily dissassembled and reassembled with different size inner electrodes 50 and outer electrodes 56. The electrodes are preferably made of stainless steel and the insulation is preferably Delrin.

The electrode configuration shown in FIG. 2b is very advantageous for reducing sparking between electrodes 50 and 56. Also, the electrodes are arranged to provide a potential distribution and electric field patterns that prevent the growth of microorganisms in the food being treated. The inner electrode length and outer disc electrode diameter are preferably at least 6 times greater than the gap 60, so the fluid is subjected to the pulsed high voltage treatment as it passes through gap 60 between electrodes 50 and 56 during traversal through the treatment chamber 22.

The food sample in feed tank 42 (FIG. 1) is pumped into the chamber 22 under pressure (110 to 500 kPa abs) and is collected into a discharge tank (not shown) after pulsed treatment. A 3-way valve (not shown) controls product flow rates. The pipe configuration allows a fully developed flow within the chamber.

Figure 3A:
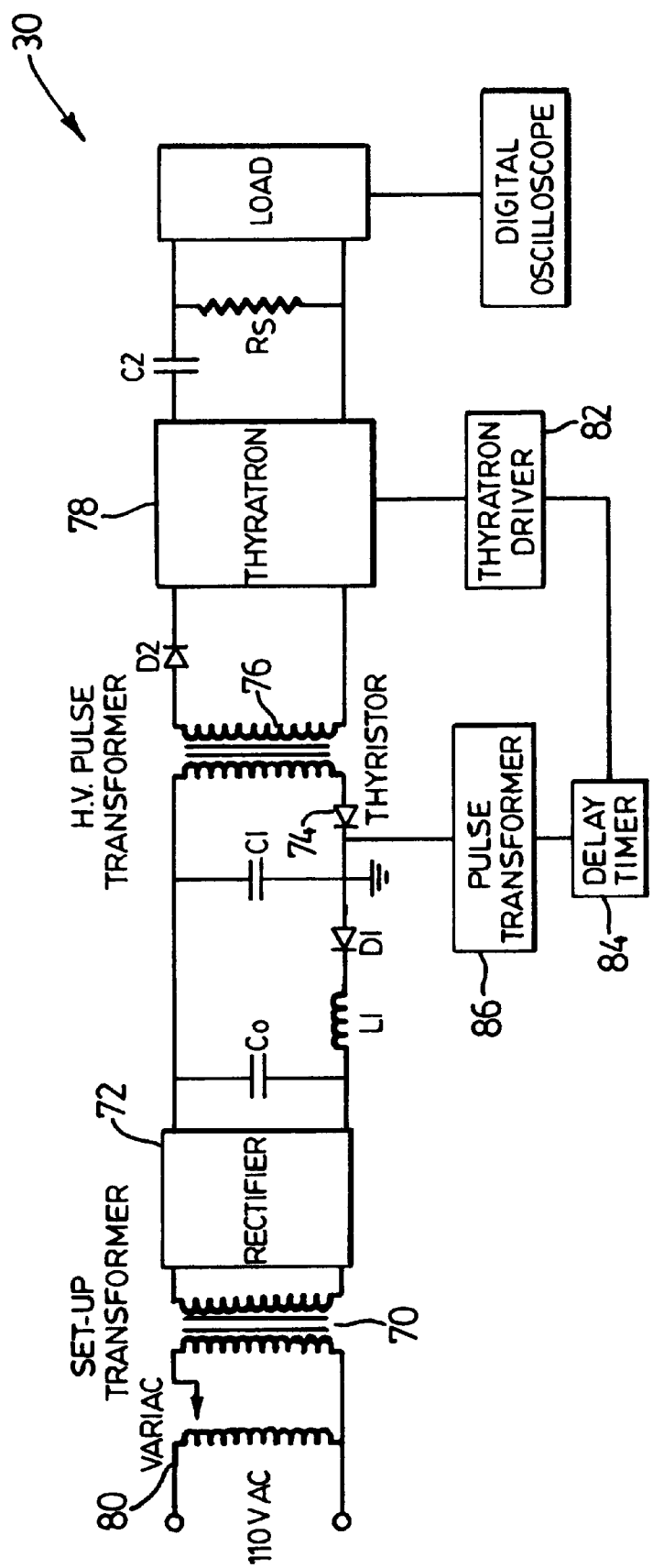
FIG. 3a is a circuit schematic diagram of a pulse generator unit for generating low-energy (<1 to 25 J/pulse) instant-charge-reversal pulses at different electric field (15 to 120 kV/cm) and pulse frequencies (0.5 to 2000 pulses/s) for electrically treating foodstuffs according to the present method.

Pulse generator 30 of FIG. 1 is designed to generate low-energy high-voltage instant-charge-reversal pulses. FIG. 3a shows the block diagram of generator 30. The 110 V a.c. is raised in voltage through a step-up transformer 70, and then rectified through a rectifier 72. The d.c. low voltage supply then charges up the low voltage pulse capacitor ($C_1$) through an electrolytic capacitor bank ($C_0$) and an inductor ($L_1$). The generation of high voltage pulses relies on a chain of synchronized circuit actions. First, the low voltage capacitor bank discharges through a thyristor 74. The voltage is then raised through a high voltage pulse transformer 76, and the high voltage capacitor ($C_2$) is charged. The discharge of the high voltage capacitor through the thyratron 78 then produces a pulsed electrical field between the electrodes in the treatment chamber. The high voltage pulse transformer 76 and diode chain are immersed in oil to prevent corona and arcing. By controlling the variac 80, the unit can provide up to 30 kV of high voltage pulses.

The thyratron driver 82 provides a train of 600 V, 1 $\mu$s square wave pulses with adjustable frequencies to trigger the grid-cathode gap of the thyratron 78, and to provide a synchronous output for triggering the delay timer 84. The delay timer 84 provides a triggering pulse for the thyristor 74 with a 500 μs delay with respect to the triggering of the thyratron 78. This allows enough time for the thyratron switch to clear from conducting all the discharging current of the high voltage capacitor. The pulse transformer 86 serves to separate the thyristor 74 from the triggering delay timer 84. In this configuration, the pulse rise time is in the range of nanoseconds, and the pulse frequency can be adjusted between manual operation or an automatic sequence of 0.5 to 2000 Hz.

Pulse Waveform

The pulse waveform plays an important role in determining the efficiency of the electrically based pasteurization process. The energy required to achieve maximum microbial control and minimum quality loss of the fluid product impacts on both the economical and technical aspects of the process. The pulse waveform (frequency, width, and peak voltage) preferably should allow the system to accomplish the following tasks: (i) allow the power supply to recharge to its full capacity in between pulses, (ii) to induce the critical transmembrane potential on the cell membrane, (iii) to cause electric breakdown of the microbial membrane (cell lysis), and (iv) to provide pasteurization of the liquid food product with minimal deleterious thermal, chemical, and physical impact on the liquid medium.

Figure 3B:
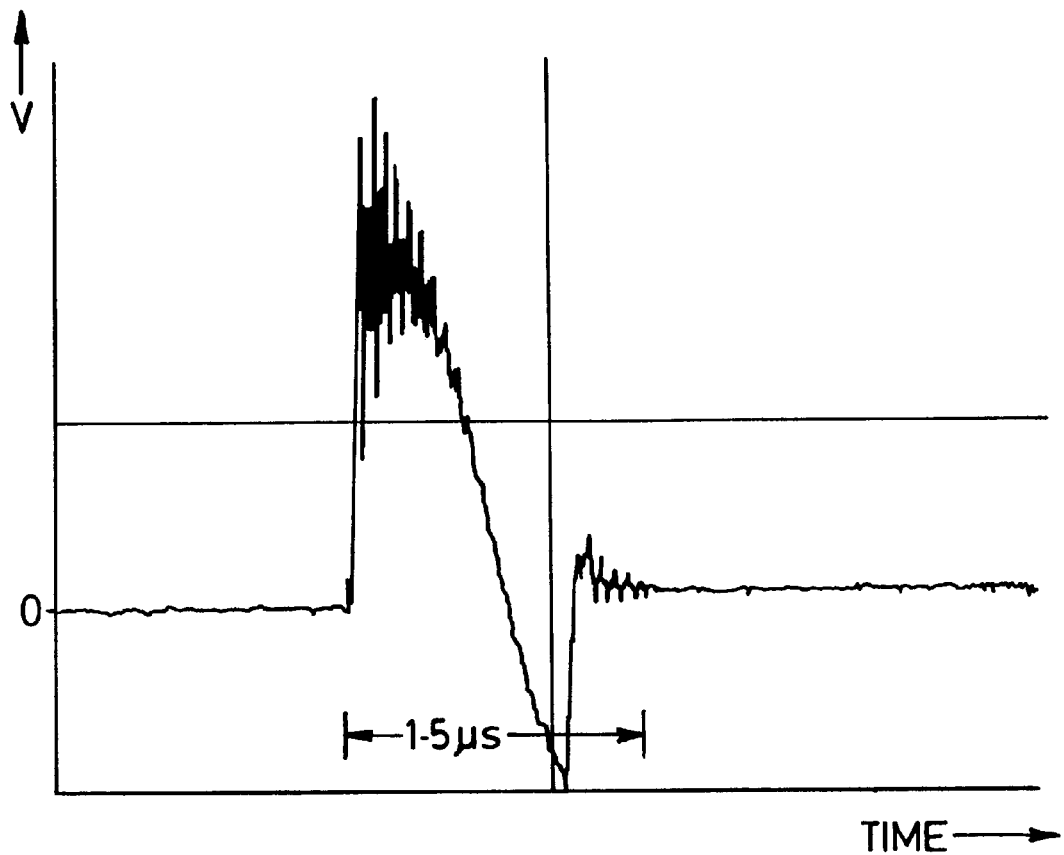
FIG. 3b shows voltage versus time trace of an instant charge reversal pulse waveform used for treating foodstuffs according to the present method.

FIG. 3b shows a waveform (voltage versus time) of a typical instant charge reversal pulse produced using the power supply of FIG. 3a. This waveform (referred to as an instant-charge-reversal pulse) comprises an increasing voltage amplitude of one polarity with a very steep or rapid rise time and within nanoseconds the voltage decreases continuously down to zero volts and then continues through zero to the opposite polarity. Therefore there is no time gap between positive and negative pulses such as found in previous processes. While the waveform is shown in FIG. 3b as rapidly rising with a positive voltage and then reversing to decrease to zero and then continuously negative before returing to zero, it will be understood by those skilled in t he art that the waveform could be reversed in time, namely going from zero volts and decreasing in the negative direction and then reversing back up to zero and continuing positive and then back to zero.

Extensive studies by the inventors have shown that pulses with instant-charge-reversal are more effective than exponential-decay pulses in terms of microbial control and thereby energy demand for the process. The preferred pulse widths of the instant charge reversal pulse waveforms of FIG. 3b are in the range from about 1 to about 5 μsec with preferred peak field strengths in the range from about 15 to about 120 kVolts/cm depending on the food type being treated. Current methods of electrical treating foodstuffs using square or exponential decay waveforms with and without bipolarity have been described in previous patents as mentioned above. In the present process, due to the unique design of pulse generator 30 shown in FIG. 3a, the energy per pulse is significantly lower than in those processes using the exponential decay or square waves thereby advantageously avoiding problems with electrolysis and other forms of degradation of the foodstuff.

The unique pulse shape of FIG. 3b, when used to treat food, is found to increase the efficiency of killing microbes. Treating food in this way is accompanied by increased microbial killing rates of 20 to 50 times over the prior art. Two to ten such pulses are sufficient to provide more than 7 log cycle reduction in microbial level (>7 D). The amplitude of the reversed charge pulse is not high enough to provide cell membrane breakdown, but it produces high alternating stress on the cell membrane causing structural fatigue. This helps to handle large volume of food effectively.

In the present instant-charge-reversal method of generating electrical pulses, the pulse waveform is characterized by a +ve part and −ve part of the pulse with various pulse widths and peak field strengths. The relative values of resistor (R), capacitor (C) and inductor (L) of the electric circuit determine the relative size and shape of the +ve and −ve part of the instant-charge-reversal pulses. For a fixed R, C and L of a pulser, increasing the electrical conductivity of the food decreases the duration of the −ve part and increases the span of the −ve part of the pulse. Also, the −ve to +ve peak voltage ratio increases as the conductivity of the food increased.

An instant-charge-reversal pulse with charge reversal at the end of a pulse is considerably different from a standard bipolar pulse. In the latter, the polarity of the pulses is reversed alternately with relaxation time in between pulses. Even with a high frequency pulser (e.g. 1000 Hz) the dielectric relaxation time at zero voltage between 4 μs square wave pulses is 0.996 ms. In instant-charge-reversal, the charge reversal is virtually instant with almost no time lag, and an oscillating field is applied.

When 10 to 25 kV/cm electric field strength was applied, less than 10 pulses provided 6 to 7 log cycle reductions in various solutions. When the same number of exponential decay pulses of the same peak field strength were applied, less than 0.6 log cycle reduction was achieved. Thus the magnified killing power of these instant-charge-reversal pulses compared to exponential decay pulses are very significant.

The voltage waveforms across the batch treatment chamber (at load) were modeled as a function of voltage supply, time, and circuit elements (resistor, capacitor, and inductor). Equation 1 shows the general form.

$$V_L = -V_S \cdot R \cdot C \cdot \omega \cdot \sin(\omega t) \cdot \exp(-\alpha t) \cdot F_s \quad (1)$$

where $V_L$=voltage measured at load, kV; $_SV$=voltage supply at discharging capacitor, kV; R=load resistance, Ω; C=discharging capacitance, μF; ω=angular frequency, rad; α=circuit time constant, 1/μs; t=time, μs; and $F_s$=shaping function.

$$\omega = \sqrt{\frac{1}{L \cdot C} - \alpha^2} \quad (2)$$

$$\alpha = \frac{R}{2 \cdot L} \quad (3)$$

where L=inductance of discharging circuit, μH.

The shaping function was used to represent the dynamic action of the thyratron switch with respect to the load resistance, and was expressed by 2 function terms, $$F_s = P_{10} \cdot \exp(-p_1 t) - P_{20} \exp(-P_2 t) \quad (4)$$

where $P_{10}$ and $P_{20}$=shaping parameters; and $p_1$ and $P_2$=shaping parameters, 1/s. The first function term represents the charging action (open switch), and the second function term represents the firing action (close switch). $P_{10}$ and $P_{20}$ symbolize the amplitude of the pulses, whereas $p_1$ and $p_2$ symbolize the time constant of the pulses. Shaping parameters were modeled by simple exponential decay and linear models, as follows:

$$P_{10}(R) = Q_1 \cdot \exp(-q_1 \cdot R); \quad P_{20}(R) = Q_2 \cdot \exp(-q_2 \cdot R) \quad (5)$$

$$P_1(R) = U_1 + u_1 \cdot R; \quad P_2(R) = U_2 + u_2 \cdot R \quad (6)$$

where $Q_1$ and $Q_2$=constants; $U_1$ and $U_2$=constants, 1/s; $q_1$ and $q_2$=constant, S; and $u_1$ and $u_2$=constants, S/s. With $C=0.12$ $\mu F$ and $L=2$ $\mu H$ (length of wire (l)=145 cm and radius of wire ($r_w$)=0.25 cm), shaping function parameters are listed in Table 1.

TABLE 1

Overall shaping function parameters of Equations 5 and 6.

| Parameters | 1st function term | 2nd function term |
| --- | --- | --- |
| Q | 258.529 | −2.805 |
| q (S) | −3.285 | 0.142 |
| U (E6, 1/s) | 13.932 | 0.347 |
| u (E6, S/s) | −1.791 | 0.196 |

Since most fluid food products are highly conductive (>2 mS/cm, which yields a load resistance of <1 Ω), this treatment system can provide a relatively stable pulse configuration (rise time≈50 ns, total pulse width≈2.25 μs, and −ve:+ve peak voltage≈2:1) across the solutions if desired. On the other hand, the relative distribution of the pulse width and voltage (the ratio of the −ve to +ve portion of the pulse) would change depending on the load resistance. Tables 2 arid 3 show the voltage pulse waveform distribution of the test solutions.

TABLE 2

Voltage pulse waveform distribution of the test solutions at 10 kV voltage supply.

| R, Ω | Peak voltage, 1st portion, −ve, kV | Pulse width, 1st portion, μs | Peak voltage, 2nd portion, +ve, kV | Pulse width, 2nd portion, μs |
| --- | --- | --- | --- | --- |
| 7.421 | 8.6 | 3.5 | Not present | — |
| 2.474 | 5.2 | 1.9 | 1 | 0.35 |
| 1.091 | 4.4 | 1.7 | 1.4 | 0.55 |
| 0.545 | 4 | 1.4 | 1.95 | 0.85 |
| 0.364 | 4 | 1.3 | 1.95 | 0.92 |
| 0.182 | 4.1 | 1.2 | 2.1 | 1 |

TABLE 3

Voltage pulse waveform distribution of the test solutions at 20 kV voltage supply.

| R, Ω | Peak voltage, 1st portion, −ve, kV | Pulse width, 1st portion, μs | Peak voltage, 2nd portion, +ve, kV | Pulse width, 2nd portion, μs |
| --- | --- | --- | --- | --- |
| 7.421 | 15.5 | 3.5 | Not present | — |
| 2.474 | 9.6 | 1.9 | 1.9 | 0.40 |
| 1.091 | 8.4 | 1.65 | 2.6 | 0.65 |
| 0.545 | 7.8 | 1.4 | 3.4 | 0.70 |
| 0.364 | 7.8 | 1.3 | 3.6 | 1 |
| 0.182 | 8.4 | 1.15 | 3.8 | 1.15 |

By definition, a RCL circuit is critically damped when $R^2=4L/C$, and underdamped when R is below that value (Giancoli, 1984). Using $C=0.12$ $\mu F$ and $L=2$ $\mu H$, R needs to be 8.2 Ω. From the experimental results, with a load resistance of 7.421 Ω, the waveform resembles an exponential decay under critical damping. As the load resistance decreases (from 7.421 to 0.182 Ω), the waveforms resemble an underdamped system.

Since the thyratron switch (FIG. 3a) only allows the passage of uni-directional current, oscillations cannot persist in the circuit, thus giving rise to the "instant-charge-reversal" shown in the results (shown as 1st and 2nd portions of the pulse in Tables 2 and 3, with the 2nd portion becoming more and more prominent as the resistance decreases). On the other hand, the diode chain in the continuous system allows the passage of current in both directions, and the system can undergo complete underdamping.

Voltage waveforms of the selected fluid products (waste brine, fresh orange juice, fresh apple cider) and two test solutions (tap water and 0.235% NaCl) were also taken at 15 kV voltage supply and 0.3 cm electrode distance. Values of α and ω for the fluid products are shown in Table 4. The model can be used for interpolation (0.2 Ω≦R≦7.4). Table 5 shows the voltage pulse waveform distribution of the fluids, and the waveforms are shown in FIGS. 4 to 6.

TABLE 4

Circuit parameters of selected fluid products.

| Solution | Electrical conductivity, mS/cm | Electrode gap, cm | Resistance, Ω | α E6, 1/s | ω E6, rad |
| --- | --- | --- | --- | --- | --- |
| Tap water | 0.735 | 0.3 | 2.474 | 0.619 | 1.945 |
| 0.235% NaCl | 5 | 0.3 | 0.364 | 0.091 | 2.039 |
| Orange juice | 3.5 ± 0.1 | 0.3 | 0.5195 | 0.1299 | 2.037 |
| Apple cider | 2.5 ± 0.1 | 0.3 | 0.7273 | 0.1818 | 2.033 |
| Waste brine | 300 ± 20 | 0.3 | 0.182 | 0.0455 | 2.041 |

TABLE 5

Voltage pulse waveform distribution of various solutions at 15 kV voltage supply.

| Solution | Resistance, Ω | Peak voltage, 1st portion, −ve, kV | Pulse width, 1st portion, μs | Peak voltage, 2nd portion, +ve, kV | Pulse width, 2nd portion, μs |
| --- | --- | --- | --- | --- | --- |
| Tap water | 2.474 | −7 | 2 | 1.1 | 0.3 |
| 0.235% NaCl | 0.364 | −5.8 | 1.3 | 2.8 | 0.95 |
| Orange juice | 0.5195 | −6.2 | 1.4 | 2.8 | 0.85 |
| Apple cider | 0.7273 | −6.2 | 1.5 | 2.4 | 0.75 |
| Waste brine | 0.0061 | −5.8 | 1 | 3.2 | 1.25 |

The characteristic time constant (T, relaxation time) of the cell membrane, is expressed as $$\tau = r_c \cdot C_m \cdot \left(\frac{1}{\sigma_i} + \frac{1}{2\sigma_e}\right) \quad (7)$$

(Ho and Mittal, 1996) where $r_c$=cell radius, m; $C_m$=membrane capacitance per unit area, F/m$^2$; $\sigma_e$ and $\sigma_i$=electrical conductivities of the external suspending medium and the cytoplasm respectively, S/m. $r_c$ is in the order of $10^{-4}$ cm, $C_m \approx 1$ μF/cm$^2$, $\sigma_i \approx 0.01$ S/cm, and $\sigma_e$ is in the order of 500 μS/cm to 300 mS/cm in this invention, thus T is in the range of $10^{-1}$ to $10^{-2}$ μs. This is much less than the 1–5 μs pulse width used in the present method. In other words, the method employed should be able to provide enough time for the generation of critical transmembrane potential (TMP) on the cell membrane. The membrane discharging time ranges from 1 to 10 μs, while 0.1 ms to 2.8 h is needed for membrane recovery. The pulse frequencies used in the present invention (from about 0.5 to about 2000 Hz) provide enough time for irreversible membrane rupture (or short enough to prevent membrane recovery), and allow the system to recharge to its full capacity in between pulses.

In summary, the present invention provides a method and apparatus to generate high-field (up to 120 kV/cm), short-time (1–5 μs), low-energy (0.1–25 J per pulse) electric pulses. The method disclosed herein using high-voltage, short-time low-energy electrical pulses is highly advantageous over previoius methods since there is no significant heating of the foodstuff or loss of natural vitamins and flavours. The food is minimally processed while maintaining the freshness of the treated food. The food can be treated at low temperatures as low as −7° C., which is not possible with many current processes.

The present system may be scaled depending on the type and load to be treated. The process may be scaled up by first by increasing the frequency of pulses. If the frequency is increased to 2000 pulses/s from 200 pulses/s, the flow rate of food to be treated is increased from 180 L/h to 1800 L/h. The system may also be scaled up by coupling multiple treatment chambers in series or in parallel. Several treatment chambers in parallel will increase the output of the system by the number of chambers. In such a system, pulses may be applied from a single pulse generator and routed through a selective switch controlled automatically.

EXAMPLES

FLUID PRODUCTS FOR PULSED POWER TREATMENT

Examples of several different fluid products (waste brine solution, fresh orange juice and fresh-pressed apple cider) in continuous mode treated by pulsed electrical fields will now be presented. It will be understood that these are non-limiting examples and are meant to illustrate the method and not in any way limit the process. In these examples a maximum process pumping rate of 180 L/h was used. Experiments were carried out to study and correlate the relationships between pulse waveform (peak voltage, pulse width, pulse frequency), fluid characteristics (composition and properties), and microbial survivability.

Waste Brine Solution

Brine (sodium chloride) solution is used by many meat processors in bacon and wiener processing. After cooking in the smokehouse, the meat product is transferred for chilling operations. The purpose is to wash off excess fat and smoke from the product, to provide excess salt at the surface of the product and to cool the product sufficiently so it can be passed through further operations such as slicing and packaging along the processing line. Brine (sodium chloride) solution at −6 to −8° C. is pumped from a loading tank and sprayed onto the product. The wash-off brine is then collected, recycled back to the tank, and re-used. The flow rate of the brine solution is automatically adjusted to the required cooling rate. Currently, the change-over rate of the brine solution is every 2–3 days. During this period, contamination of the brine solution (and, thus, the product) is unavoidable. Operations such as preparing and loading of the brine solution to the brine tank, or pumping and recycling the solution through pipes and spray nozzles, all result in the brine solution being prone to contamination. Some industrial records have indicated that the standard plate count of some waste brine solutions can be as high as 3,000 cfu/mL. Moreover, changing brine solution is a very time consuming task and the waste brine has no further use.

Orange Juice, and Apple Cider

Since 1930s, heat pasteurization has become a widespread method used to prevent food spoilage and food-borne diseases. Thermal pasteurization of orange juice not only destroys spoilage organisms but can also inactivate pectinesterase. Pectinesterase is a pectin enzyme which causes chemical changes (the native pectin is de-esterified and coagulated by the calcium ion in the juice) such that the juice separates into a clear supernatant and a layer of sediment, practically known as "cloud loss". Although temperatures above 71° C. are sufficient to destroy lactic acid bacteria, acetic acid bacteria, and most other spoilage organisms, temperatures required to prevent cloud loss range between 86–99° C. Since orange juice contains various heat sensitive flavours, other alternatives are usually employed to delay, but not prevent, the self-clarification process. Apple cider is a fresh-pressed apple juice. While some ciders may be filtered and contain preservatives such as sodium benzoate (<0.1%), most ciders are usually not heat pasteurized so as to sustain product's freshness. Hence, any pathogens on apples before pressing are likely to be present and viable in the cider.

Microbial Inactivation

The three selected products were subjected to the optimum condition(s) with the continuous treatment system at various flow rates and pulse frequencies. The main purpose was to establish process parameters to achieve maximum microbial control and minimum quality loss for each fluid product. Before and after electrical treatment microbial plate counts of colony forming units (cfu) on selected media indicated the reduction of the microbial cells under different electrical conditions and fluid products. Tests were also carried out on selected products to monitor the presence of any physical (pH, temperature, electrical conductivity, density) and chemical (vitamin) changes in the fluids tested. Shelf-life studies were also performed. The test variables in this phase were confined to the process flow rate and pulse frequency which, in combination, determined the number of pulses applied to the fluid. Other electrical and process parameters were fixed from earlier results. These factors included the voltage supply, electrode distance, and the process temperature.

Effects on Thermal, Physical, and Chemical Properties

In general, the shapes of pulse waveforms (FIGS. 4–6) seem to indicate that the energy consumed by the load is a function of the load resistance, that is, the higher the resistance, the more energy is absorbed (more potential drop across the load). Most of the load resistances tested in this study absorbed low energy. Without energy absorbtion, adverse electrochemical reactions such as electrolysis or electrophoretic effects such as electrode fouling do not easily occur.

Electrical conductivity, density (specific gravity), and pH of all test solutions and fluid products were measured and monitored before and after pulse tests. All properties were found to be unaffected under all test conditions. Table 6 summarizes the physical data of the fluid products.

TABLE 6

Physical properties of selected fluid products.

| Product | Electrical conductivity, mS/cm | Specific gravity | pH | Process temperature, ° C. |
|---|---|---|---|---|
| Waste brine | 300 ± 20 | 1.25 ± 0.01 | 7 ± 0.1 | −7 ± 2 |
| Orange juice* | 3.5 ± 0.1 | 1.03 ± 0.005 | 3.7 ± 0.2 | 4 ± 2 |
| Apple cider** | 2.5 ± 0.1 | 1.03 ± 0.005 | 3.7 ± 0.2 | 4 ± 2 |

*a blend of Navel, Valencia, Hamlin, Parson Brown, and Temple varieties.
**a blend of Jonathan, Grimes Golden, Stayman Winesap, and McIntosh varieties.

RESULTS

Waste Brine Solution

Figure 7A:
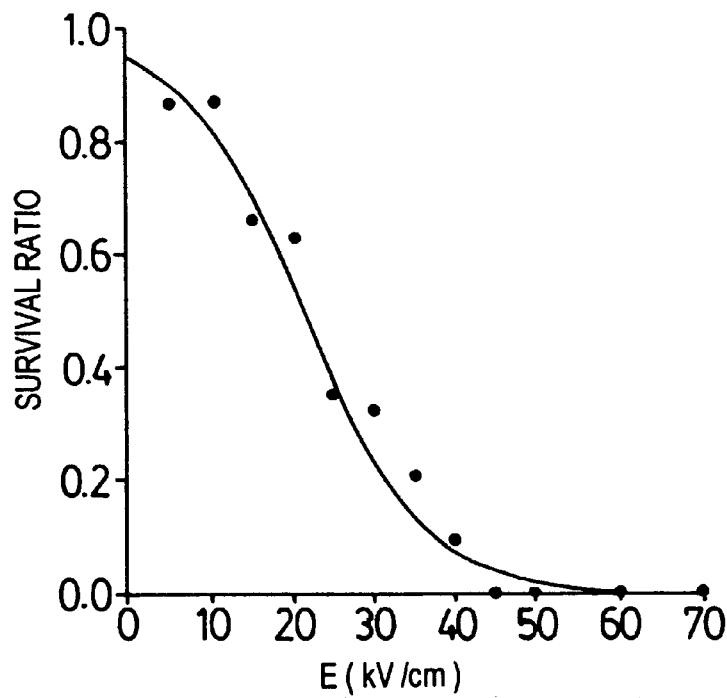
FIG. 7a is a plot of microbial survival rate of waste brine solution (total plate count) at 10 pulses.
Figure 7B:
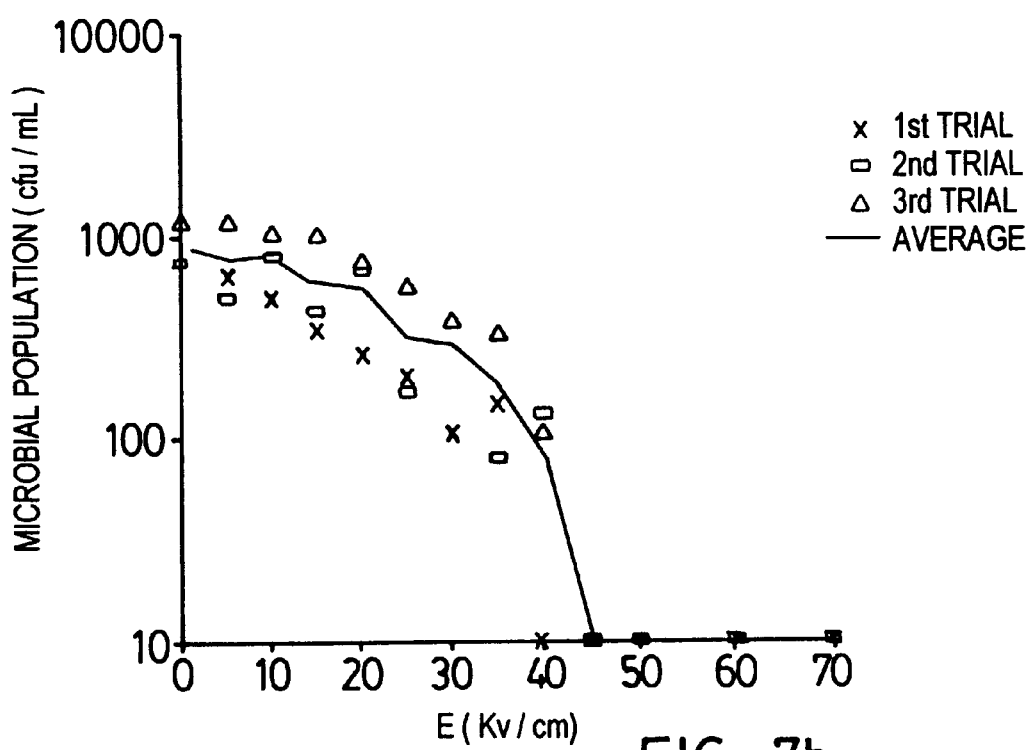
FIG. 7b shows a microbial inactivation curve on a log scale of waste brine solution (total plate count) at 10 pulses.
Figure 8A:
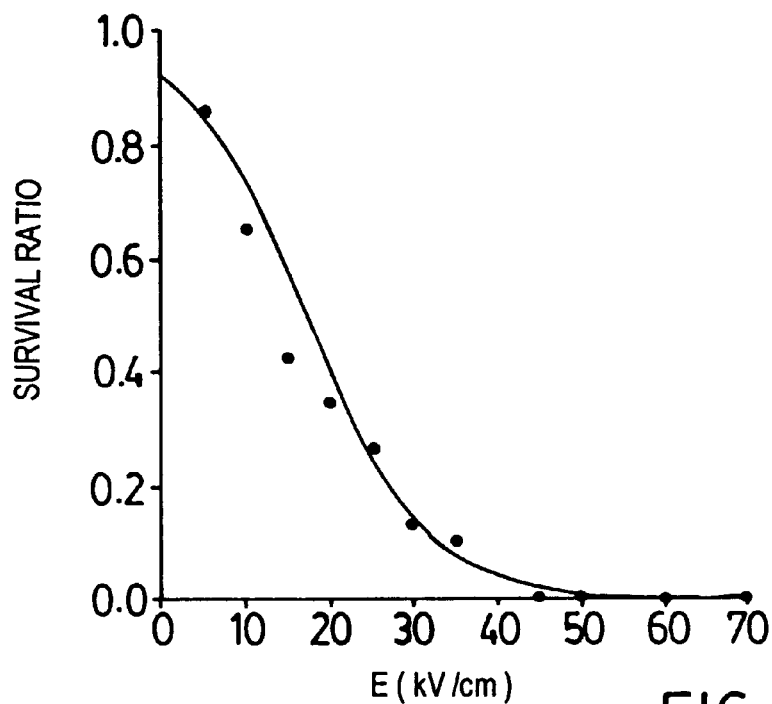
FIG. 8a shows a microbial survival curve of waste brine solution (total plate count) at 20 pulses.
Figure 8B:
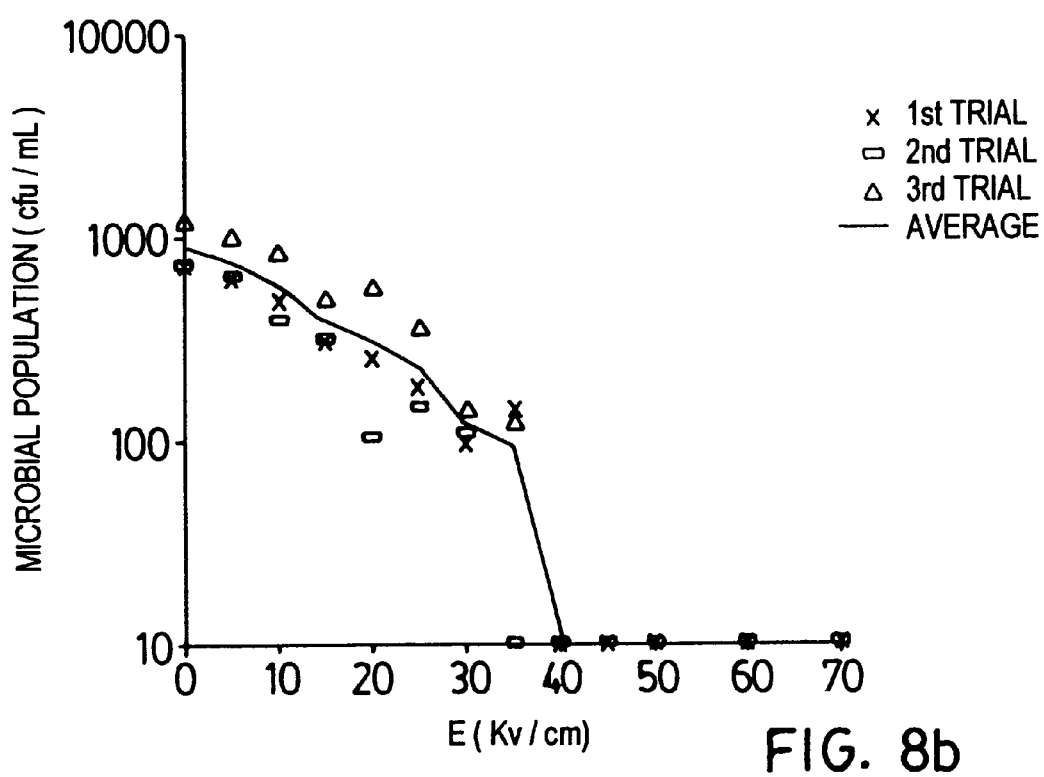
FIG. 8b shows a microbial inactivation curve on log scale of waste brine solution (total plate count) at 20 pulses.

The individual survival curves are depicted in FIGS. 7a,b and 8a,b, both in terms of survival ratio and microbial plate count (log scale). Results from standard plate count illustrate a sigmoidal relationship between microbial survivability and the applied electric field strength at all number of pulses applied. From Table 7 (ANOVA), the electric field strength applied is a far more important factor in microbial reduction than the number of pulses applied.

TABLE 7

Analysis of Variance for waste brine solution.

| | | Standard plate count | | Staphlococcus and Micrococcus | |
|---|---|---|---|---|---|
| Source | DF | Mean sum of squares | F-ratio | Mean sum of squares | F-ratio |
| Number of pulses applied | 4 | 0.052 | 11.507* | 0.036 | 11.995* |
| Electric field strength | 12 | 0.67 | 148.564** | 0.693 | 233.393** |
| Error | 48 | 0.005 | | 0.003 | |

*p > 0.05; ** p < 0.01.

This data indirectly supports the concept from transmembrane potential theory that a critical potential is required to develop on the membrane surface for cell lysis, and that the number of pulses applied only affects the area being electroporated. No detectable physical (pH, electrical conductivity, specific gravity) nor thermal changes occurred under those conditions. Selected samples were treated with the optimal treatment condition and subjected to shelf-life studies. Storage temperature was −7° C., and samples were plated every 3–4 days for three weeks. Again, no colony forming units (<10 cfu/mL) were detected on both agar media throughout the test period.

Selected sample solutions, both before and after pulse treatment using the optimum condition (60 kV/cm, one and five pulses), were analyzed by scanning electron microscopy (SEM) for visual damage to the microorganisms. Results are shown in FIGS. 11a, 11b, 12a, 12b, 13a and 13b. It is evident that microbes under pulse treatment are disrupted and ruptured while microbes without pulse treatment remain fully intact. The figures also provide support for the transmembrane potential theory.

Together with the microbial and SEM data, it is reasonable to conclude that the pulsed power treatment process employed in the present process causes irreversible damage to the microbes being tested, with negligible physical (pH, electrical conductivity, and specific gravity) and thermal changes to the waste brine solution.

Orange Juice and Apple Cider

Figure 9A:
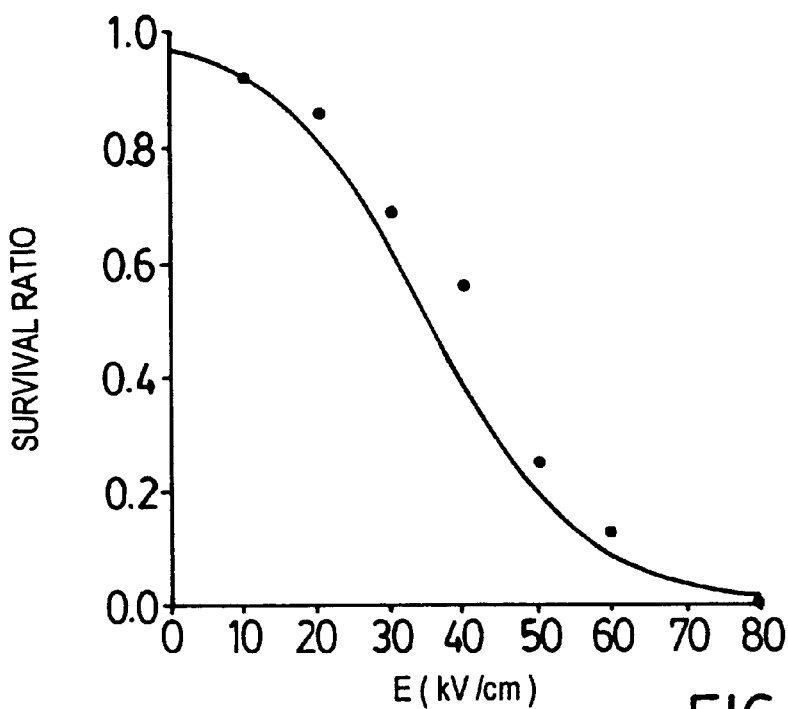
FIG. 9a is a microbial survival plot for treated orange juice (total plate count) at 10 pulses.
Figure 9B:
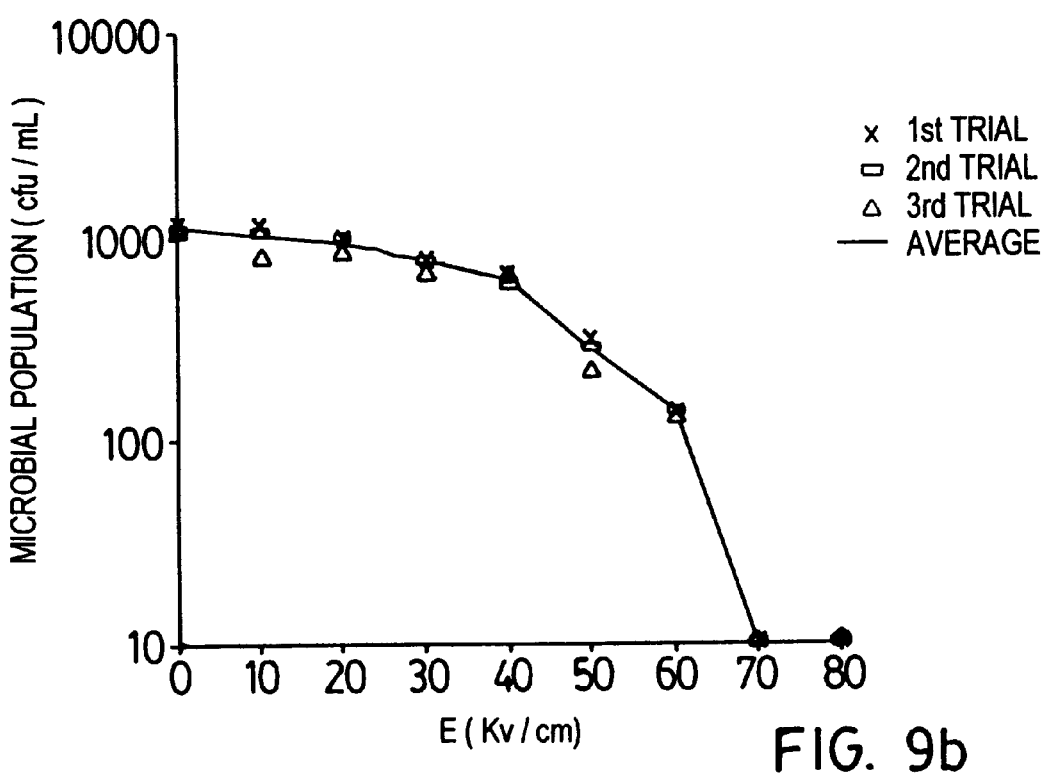
FIG. 9b shows a microbial inactivation curve on log scale for treated orange juice (total plate count) at 10 pulses.
Figure 10A:
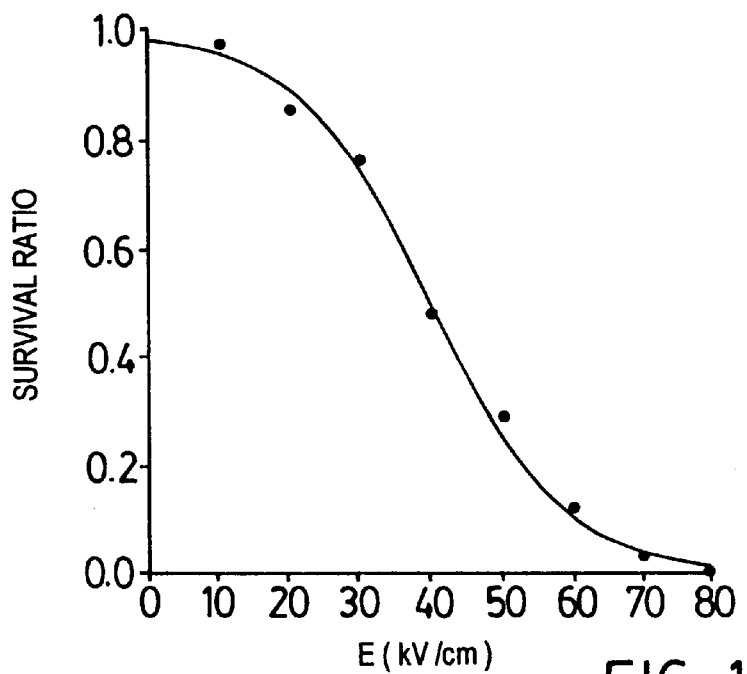
FIG. 10a is a microbial survival curve of electrically treated apple cider (total plate count) at 10 pulses.
Figure 10B:
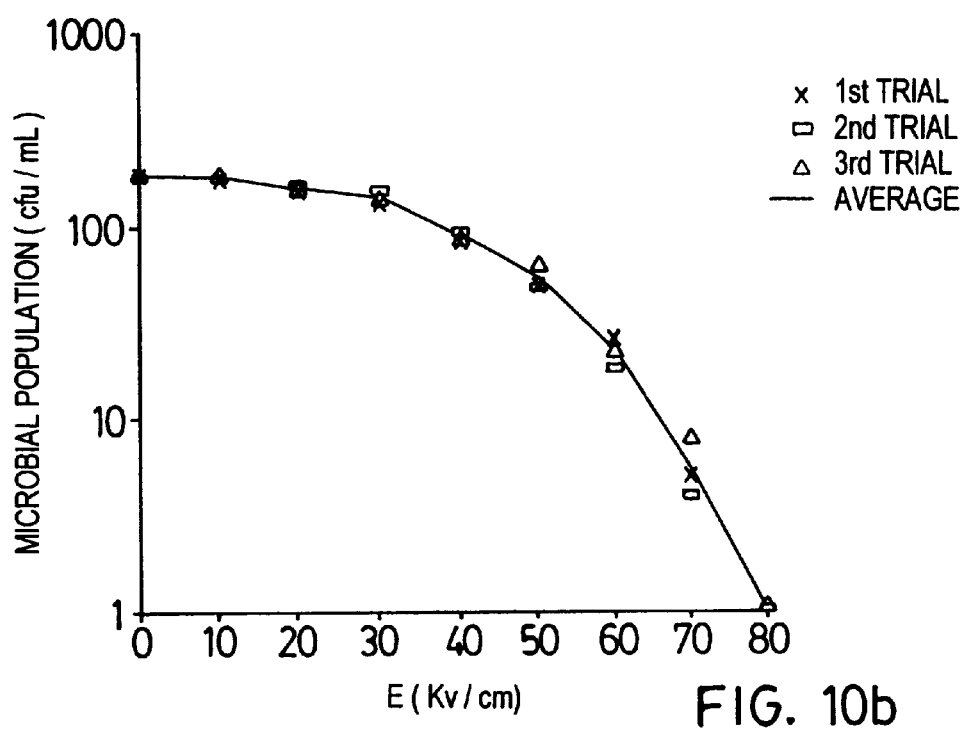
FIG. 10b is a microbial inactivation curve on log scale of electrically treated apple cider (total plate count) at 10 pulses.
Figures 11A, 11B:
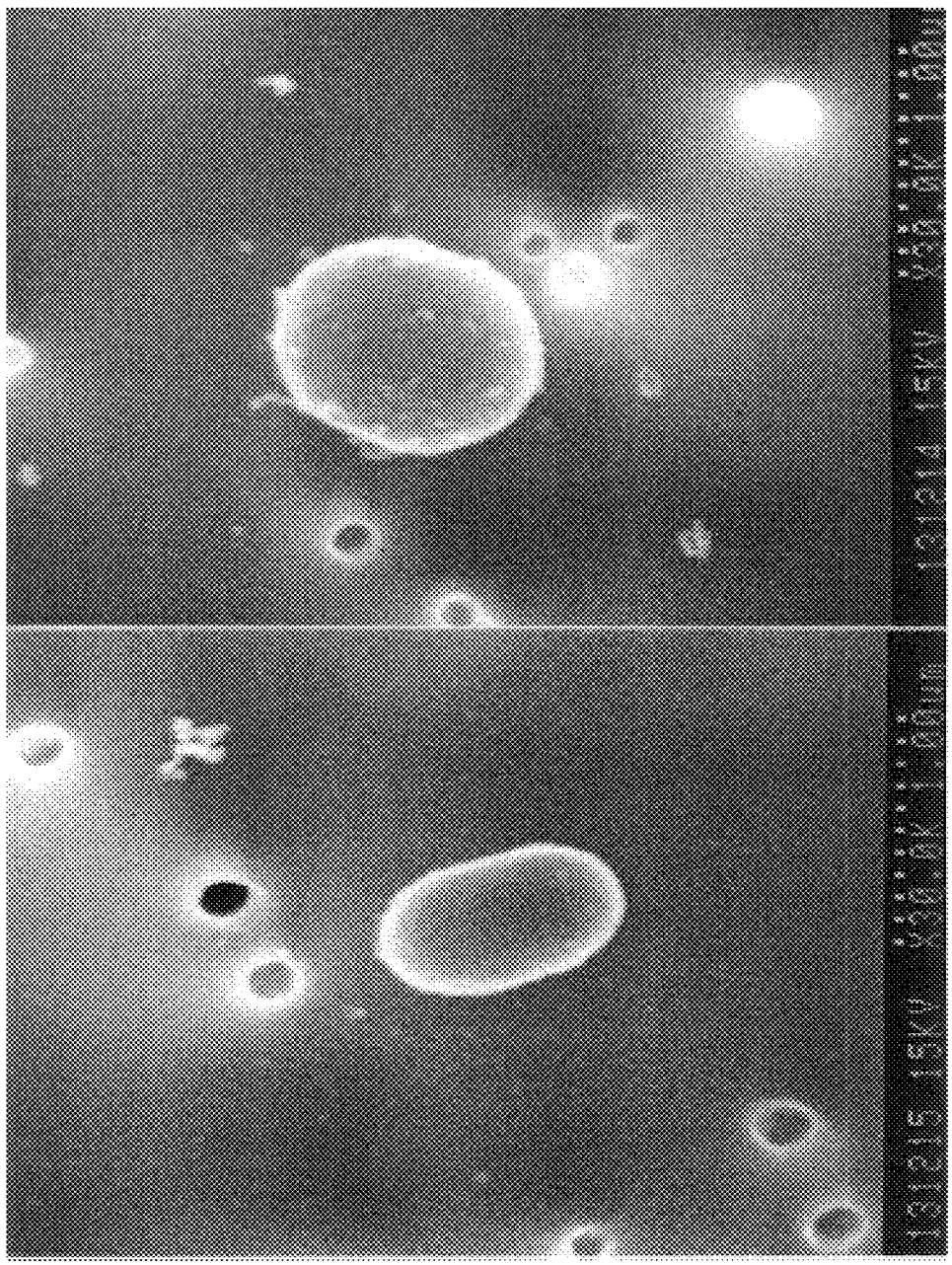
FIGS. 11a and 11b show scanning electron micrographs (magnified view (×30,000)) of microbes in waste brine solution without pulsed power treatment using scanning electron microscopy.
Figures 12A, 12B:
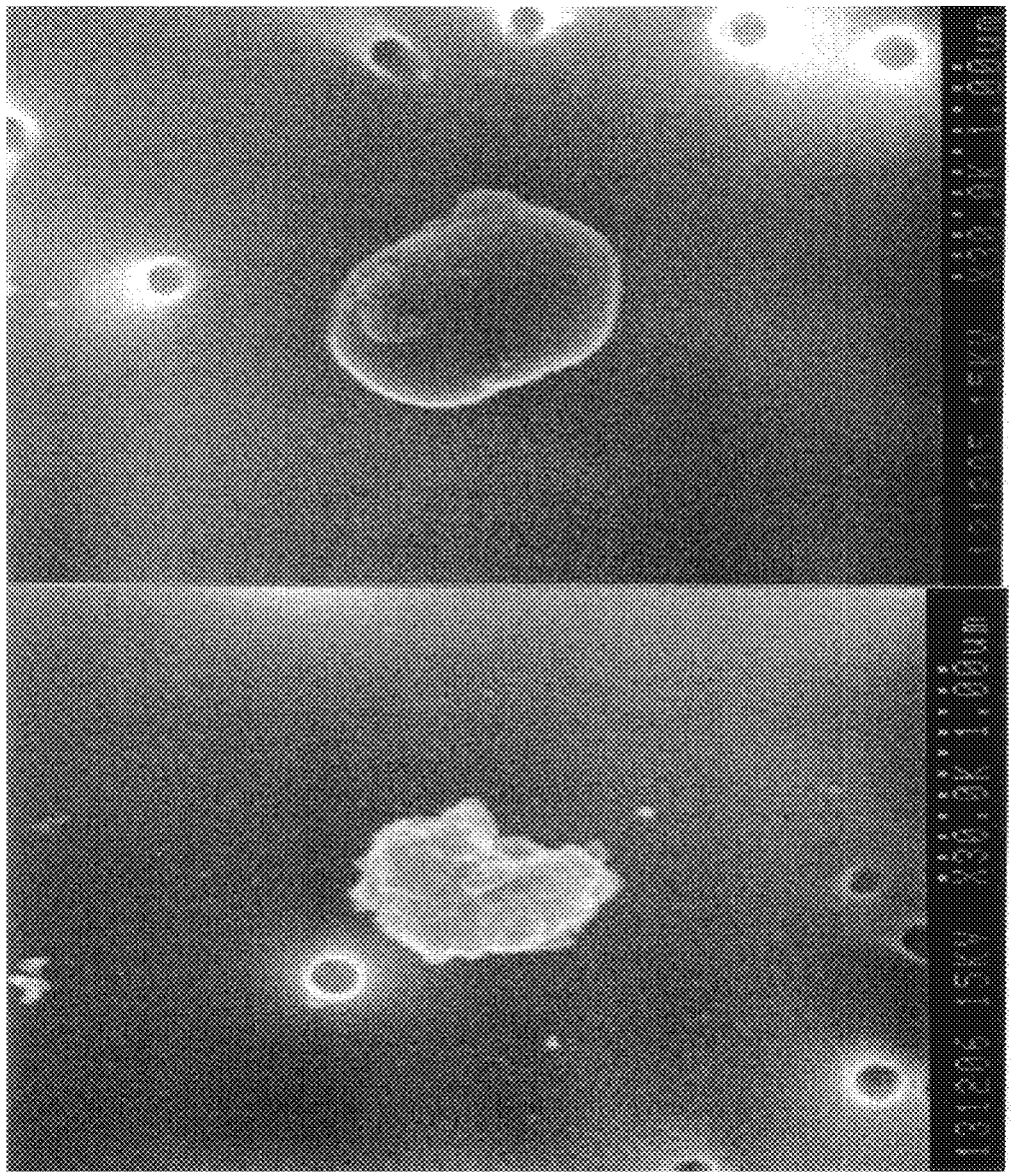
FIGS. 12a and 12b show scanning electron micrographs (magnified views (×30,000)) of microbes in waste brine solution after pulsed power treatment, treatment conditions employed were 18 kV voltage supply, 0.3 cm electrode distance, and one pulse.
Figures 13A, 13B:
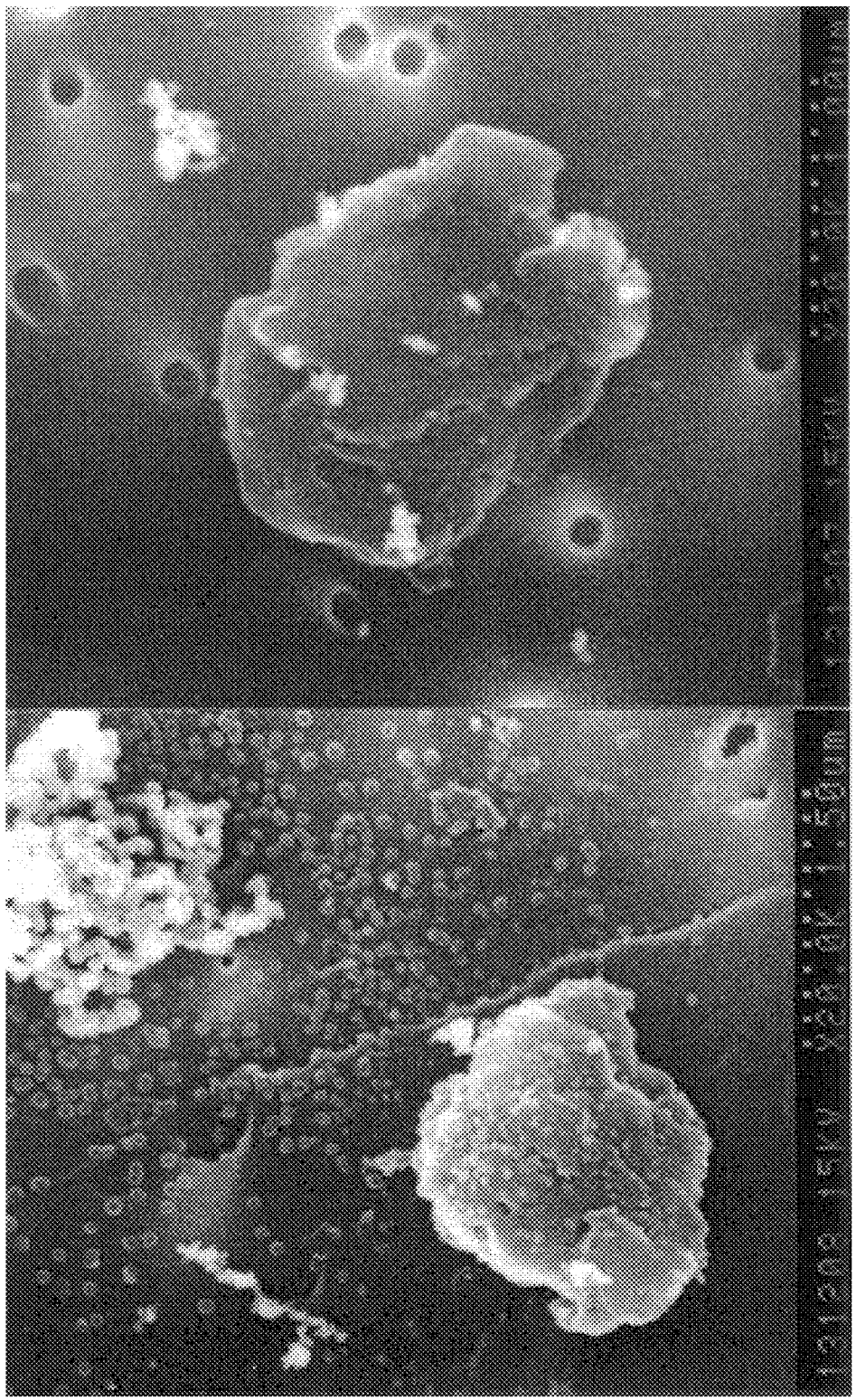
FIGS. 13a and 13b show scanning electron micrographs (magnified views (×20–30,000)) of microbes in waste brine solution after pulsed power treatment, treatment conditions employed were 18 kV voltage supply, 0.3 cm electrode distance, and five pulses.

More than 150 tests with 24 different conditions were conducted. The individual survival curves are depicted in FIGS. 9a,b and 10a,b, both in terms of survival ratio and microbial plate count (log scale). No detectable physical (pH, temperature, electrical conductivity) changes occurred under these conditions. Selected samples, both before and after optimum pulse treatment, were also analyzed for Vitamin C (Ascorbic acid). Table 8 shows the results. Data obtained from samples with no treatment are comparable to the values obtained from literature (Peterson and Johnson, 1978), indicating that the test method used is effective.

TABLE 8

Vitamin C analysis on orange juice and apple cider.

| Condition | Orange juice, mg/100 g | Apple cider, mg/100 g |
|---|---|---|
| Reference (Peterson and Johnson, 1978) | 55 | 1 |
| No pulse treatment | 49.0 | 1 |
| Pulse treatment at optimum condition | 48.9 | 1.5 |

For shelf-life studies, selected samples were treated with the optimum treatment condition(s) and stored at 7° C. Samples were plated every 7 days for 3 weeks. Again, no colony forming units were detected (<10 cfu/mL) on the agar media throughout the test period. This indicates that the pulsed power treatment process employed in this research causes irreversible damage to the microbes being tested, with negligible physical (pH, electrical conductivity, specific gravity), chemical (vitamin C), and thermal changes to the solutions tested.

The energy required to bring 50 mL of water from room temperature (20° C.) to a normal industrial pasteurization temperature (around 72° C.) can be calculated to be 10.9 kJ (that is, 218 J/mL). In this invention, the energy consumption is much lower (1.3 J/mL for waste brine; 4.41 J/mL for orange juice; and 5.76 J/mL for apple cider at 50 mL batch), and no cooling is required (process temperature was −7° C. for waste brine and 4° C. for orange juice and apple cider). This indicates tremendous energy savings in the high voltage electric pulse technology as compared to the conventional thermal pasteurization process.

The microbial reduction with respect to some test conditions are summarized in Table 9. The maximum flow rate at minimum pulse frequency under optimum condition, and thus the lowest energy consumption, was tested with waste brine solution. Number of pulses applied was estimated using the following equations: Flow rate, Q (m$^3$/s):

$$Q = A_c \cdot V_a \qquad (8)$$

Cross section area for fluid flow, $A_c$ (m$^2$):

$$A_c = \pi \cdot \frac{D_o^2 - D_i^2}{4} \qquad (9)$$

where $D_0$=outer electrode diameter, m; and $D_i$=inner electrode diameter, m. The average flow velocity, $V_a$ (m/s):

$$V_a = \frac{L_e}{t_p} \quad (10)$$

where $L_e$=electrode width, m. Total processing time, $t_p$(s):

$$t_p = n \cdot (\tau_p + \tau_w) \quad (11)$$

where n=number of pulses applied; $T_p$=pulse period, s=1/pulse frequency; and $T_w$=pulse width, s. In general, $T_p \gg T_w$. In order to calculate the minimal residence time (or the minimal number of pulses applied to the fastest moving component in the fluid product), the maximum velocity was used, which is twice the average velocity for laminar flow and newtonian fluid.

The pulse waveforms (peak voltage, pulse width), at all test frequencies and flow rates, for all products under continuous treatment were found to remain stable. This ensures that the number of pulses applied to the products passing through the treatment chamber is sufficient. From Table 9, a<10 cfu/mL (no cfu detected) plate count was obtained for waste brine, orange juice, and apple cider when samples underwent pulse treatment at optimum conditions. Again, flow rate (number of pulse applied) and process temperature appear not to be significant at the test range. The relatively small standard deviation indicates that the results from separate trials are in good agreement with each other.

under all test conditions. The use of high voltage electric pulses as a technique for microbial inactivation was found to be feasible and effective for food products. Less than 10 cfu/mL was detected when waste brine solution, fresh orange juice, and fresh-pressed apple cider were subjected to pulse treatments in the continuous flow systems.

Shelf-life studies indicated that all 3 products would maintain a<10 cfu/mL plate count for at least 3 weeks. From the microbial and scanning electron microscopy data, the pulsed power treatment process employed in this invention is beleived to cause irreversible damage to the microbes being tested, with negligible physical changes to the product.

The destruction of microbes apparently follows similar sigmoidal resistance kinetics with respect to the external electric field strength and the number of pulses applied. For all three food products, the electric field strength applied was a far more important factor in microbial reduction than the number of pulses applied. This indirectly supports the idea of transmembrane potential theory where a critical potential is required to develop on membrane surfaces for cell lysis, and that the number of pulses applied only affects the area being electroporated. The energy consumption was calculated to be 1.3, 4.41, 5.76 J/mL for waste brine, orange juice, and apple cider respectively.

The studies and results disclosed herein demonstrate the present method of electrically treating foodstuffs provides a very efficient and effective method for pasteurizing or sterilizing liquid or semi-liquid food products like waste brine solution, orange juice, and apple cider without causing significant thermal, chemical, and physical changes to the products.

TABLE 9

Phase III: Effects of flow rate on microbial inactivation (standard plate count) using the continuous treatment system.

| Product | Voltage applied, kV | Process temp., °C. | Flow rate, L/h | Pulse frequency, Hz | Pulses number applied** | Mean microbial reduction, $\log_{10}$ cycles | s.d. | Mean initial count, cfu/mL | Mean final count, cfu/mL |
|---|---|---|---|---|---|---|---|---|---|
| Waste brine | 18 | −7 | 18 | 10 | 0.5 | 1.29 | 0.16 | 1031.67 | 56 |
| | | | 18 | 20 | 1 | >2.01 | 0.05 | | <10* |
| | | | 18 | 100 | 5 | >2.01 | 0.05 | | <10* |
| | | | 18 | 200 | 10 | >2.01 | 0.05 | | <10* |
| | | | 36 | 20 | 0.5 | 1.11 | 0.03 | | 80 |
| | | | 36 | 100 | 2.5 | >2.01 | 0.05 | | <10* |
| | | | 36 | 200 | 5 | >2.01 | 0.05 | | <10* |
| | | | 120 | 200 | 2.5 | >2.01 | 0.05 | | <10* |
| | | | 180 | 100 | 0.5 | 1.12 | 0.14 | | 80 |
| | | | 180 | 200 | 1 | >2.01 | 0.05 | | <10* |
| Orange juice | 21 | 4 | 36 | 100 | 2.5 | >2.04 | 0.02 | 1108.33 | <10* |
| | | | | 200 | 5 | | | | |
| Apple cider | 24 | 4 | 36 | 100 | 2.5 | >2.27 | 0.01 | 186 | <1* |
| | | | | 200 | 5 | | | | | s.d. = standard deviation; temp. = temperature, electrode gap = 3 mm.
*No colony forming unit detected
**Number of pulses applied is calculated from Equation 11.

Using the optimum treatment conditions (where plate count gives <10 cfu/mL), the energy consumption (theoretical) can be shown as follows:

Waste brine: $E_f$=60 kV/cm at 180 L/h, 200 Hz→energy required=1.3 J/mL

Orange juice: $E_f$=70 kV/cm at 36 L/h, 100 Hz→energy required=4.41 J/mL

Apple cider: $E_f$=80 kV/cm at 36 L/h, 100 Hz→energy required =5.76 J/mL

Effects of high voltage pulses on thermal, physical, and chemical properties of the solutions on microbial control were discussed. All properties were found to be unaffected The foregoing description of the preferred embodiments of the invention and non-limiting examples have been presented to illustrate the principles of the invention and not to limit the invention to the particular embodiment illustrated. It is intended that the scope of the invention be defined by all of the embodiments encompassed within the following claims and their equivalents.

REFERENCES

Bushnell, A. H., Dunn, J. E., and Clark, W. 1991. High pulsed voltage systems for extending the shelf life of pumpable food products. U.S. Pat. No. 5,048,404.

Bushnell, A. H., Dunn, J. E., Clark, W., and Pearlman, J. S. 1993. High pulsed voltage systems for extending the shelf life of pumpable food products. U.S. Pat. No. 5,235,905.

Bushnell, A. H., Clark, R. W., Dunn, J. E., and Lloyd, S. W. 1995a. Prevention of electrofouling in high electric field systems for killing microorganisms in food products. U.S. Pat. No. 5,393,541.

Bushnell, A. H., Clark, R. W., Dunn, J. E., and Lloyd, S. W. 1995b. Prevention of electrochemical and electrophoretic effects in high strength-electric-field pumpable-food-product treatment systems. U.S. Pat. No. 5,447,733.

Dunn, J. E. and Pearlman, J. S. 1987. Methods and apparatus for extending the shelf-life of fluid food products. U.S. Pat. No. 4,695,472.

Dunn, J. E. and Pearlman, J. S. 1989. Apparatus for extending the shelf-life of fluid food products. U.S. Pat. No. 4,838,154.

Giancoli, D. C. 1984. General Physics. Prentice-Hall, Inc. Englewood Cliffs, N.J. pp. 604–610.

Gupta, R. P. and Murray W. 1989. Pulsed high electric field sterilization. 7th IEEE Pulsed Power Conference, Monterecy, Calif., Jun. 11–14, 1989.

Ho, S. Y., Mittal, G. S., Cross, J. D., and Griffiths, M. W. 1995. Inactivation of *P. fluorescens* by high voltage electric pulses. J. Food Science. 60(6):1337–1340.

Ho, S. Y. and Mittal G. S. 1996. Electroporation of cell membrane: a review. Critical Reviews in Biotechnology. 16(4):349–362.

Ho, S. Y., Mittal, G. S., and Cross, J. D. 1997. Effects of high field electric pulses on the activity of selected enzymes. J. Food Engineering. 31:69–84.

Jayaram, S., Castle, G. S. P., and Margaritis, A. 1992. Kinetics of sterilization of *Lactobacillus brevis* cells by the application of high voltages pulses. Biotechnology and Bioengineering. 40:1412–1420.

Marquez, V. O., Mittal, G. S., and Griffiths, M. W. 1997. Destruction and inhibition of bacterial spores by high voltage pulsed electric field. J. of Food Science. 62(2):1–4.

Peterson, M. S. and Johnson, A. H. 1978. Encyclopedia of Food Science. AVI Publishing Co. Inc. Westport, Connecticut. pp. 337.

Qin, B. L., Chang, F. J., Barbosa-Canovas, G. V., and Swanson, B. G., 1995. Nonthermal inactivation of *S. cerevisiae* in Apple juice using pulsed electric fields. Food Sci. & Technology. 28:564–568.

Sato, M., Kimura, K., Ikeda, K., Ogiyama, T., and Hata K. 1994. Sterilization of Beverages under Normal Temperature by a High-Voltage, Pulsed Discharge. In Developments of Food Engineering, Proceeding of the 6th International Congress in Engineering and Food, edited by Yano, T., Matsuno, R., Nakamura, K. Blackie Academic and Professional. Glasgow, UK. pp. 736–738.

Vega-Mercado, H., Powers, J. R., Barbosa-Canovas, G. V., and Swanson, B. G. 1995. Plasmin inactivation with pulsed electric fields. Journal of Food Science. 60(5):1143–1146.

Vega-Mercado, H., Martin-Belloso, O., Chang, F. J., Barbosa-Canovas, G. V., and Swanson, B. G. 1996. Inactivation of *Escherichia coli* and *Bacillus subtilis* suspended in pea soup using pulsed electric fields. J. of food Processing and Preservation. 20:501–510.

Yin, Y., Zhang, Q. H. and Sastry, S. K. 1997. High voltage pulsed electric field treatment chambers for the preservation of liquid food products. U.S. Pat. No. 5,690,978.

Zhang, Q., Monsalve-Gonzalez, A., Barbosa-Canovas, G. V., and Swanson, B. G. 1994a. Inactivation of *E. coli* and *S. cerevisiae* by Pulsed electric field under controlled temperature conditions. Transactions of the ASAE. 37(2):581–587.

Zhang, Q., Monsalve-Gonzalez, A., Qin, B., Barbosa-Canovas, G. V., and Swanson, B. G. 1994b. Inactivation of *S. cerevisiae* in apple juice by square-wave and exponential decay pulsed electric fields. J. of Food Process Engineering. 17:469–478.

Zhang, Q., Chang, F. J., Barbosa-Canovas, G. V., and Swanson, B. G. 1994c. Inactivation of microorganisms in a semisolid model food using high voltage pulsed electric fields. Food Science and Technology. 27(6):538–543.

Zhang, Q., Barbosa-Canovas, G. V., and Swanson, B. G. 1995a. Engineering aspects of pulsed field pasteurization. J. of Food Engineering. 25:261–281.

Zhang, Q., Qin, B., Barbosa-Canovas, G. V., and Swanson, B. G., 1995b. Inactivation of *E. coli* for food pasteurization by high-strength pulsed electric fields. Journal of Food Processing and Preservation. 19:103–118.

Zhang, Q., Qin, B., Barbosa-Canovas, G. V., Swanson, B. G. and Pedrow, P. D. 1996. Batch mode food treatment using pulsed electric fields. U.S. Pat. No. 5,549,041.

Therefore what is claimed is:

1. A method for electrically treating foodstuffs, comprising:

positioning a foodstuff between at least two electrodes; and applying electrical pulses to said foodstuff located between said at least two electrodes, each electrical pulse having a waveform comprising a voltage amplitude rapidly changing from a preselected voltage level to a first voltage peak on one side of said preselected voltage level followed immediately thereafter by a voltage amplitude returning to said preselected voltage level and continuing to a second voltage peak on the other side of said preselected voltage level followed thereafter by a rapidly changing voltage amplitude returning substantially back to said preselected voltage level, each electrical pulse having a pulse energy in a range from about 0.1 to about 25 Joules.

2. The method for electrically treating foodstuffs according to claim 1 wherein said preselected voltage level is substantially zero volts, and wherein said first voltage peak is one of one polarity and the second voltage peak is of opposite polarity to said first voltage peak.

3. The method for electrically treating foodstuffs according to claim 2 wherein said electrical pulse has a pulse width in a range from about 1 to about 5 $\mu$sec, and wherein said pulse has a rise time of the order of nanoseconds.

4. The method for electrically treating foodstuffs according to claim 2 wherein said electrical pulse is obtained by first applying a charge of said preselected polarity to one of said at least two electrodes and thereafter instantly reversing the polarity of said charge on said electrode.

5. The method for electrically treating foodstuffs according to claim 3 wherein said electrical pulse has a peak voltage in a range from about 10 to about 30 kVolts.

6. The method for electrically treating foodstuffs according to claim 3 wherein said two electrodes are spaced apart an effective distance to give a pulse peak field strength in a range from about 15 kVolts/cm to about 120 kVolts/cm.

7. The method for electrically treating foodstuffs according to claim 6 wherein said electrical pulses are applied at a rate in a range from about 0.5 pulse per second to about 2000 pulses per second.

8. The method for electrically treating foodstuffs according to claim 3 wherein the step of positioning said foodstuff between said at least two electrodes includes continuously flowing said foodstuffs between said two electrodes.

9. The method for electrically treating foodstuffs according to claim 1 wherein said foodstuff is at a temperature below room temperature during treatment.

10. The method for electrically treating foodstuffs according to claim 1 wherein said first electrode is an annular disc with a hole therethrough and said second electrode is a cylindrical electrode inserted in said hole in the first electrode, said hole having a diameter greater than a diameter of said cylindrical electrode to provide a gap between said first and second electrodes.

11. The method for electrically treating foodstuffs according to claim 10 wherein said gap is in a range from about 0.1 cm to about 1.0 cm.

12. An apparatus for electrically treating foodstuffs, comprising:
   a) a chamber comprising an inlet conduit, an outlet conduit, a first electrode and a second electrode spaced from the first electrode for making electrical contact with a foodstuff located in said chamber between said first and second electrodes;
   b) pulse generator means for applying electrical pulses to one of said electrodes to provide an electric field between said electrodes through a foodstuff located therebetween in said chamber, said electrical pulses having a waveform comprising a rapidly changing voltage amplitude from a preselected voltage level to a first voltage peak on one side of said voltage level followed immediately thereafter by a voltage amplitude returning to said preselected voltage level and continuing to a second voltage peak on the other side of said voltage level followed thereafter by a rapidly changing voltage amplitude returning back to substantially said preselected voltage level, the electrical pulses each having a pulse energy in a range from about 0.1 to about 25 Joules; and
   c) pump means for pumping a foodstuff through said inlet conduit and through said chamber.

13. The apparatus according to claim 12 wherein said pulse generator is adapted to provide said preselected voltage level at substantially zero volts, and wherein said first voltage peak is one of one polarity and the second voltage peak is of opposite polarity to said first voltage peak.

14. The apparatus according to claim 12 wherein said pulse generator is adapted to provide electrical pulses having a pulse width in a range from about 1 to about 5 μsec, and wherein said rapidly changing voltage amplitude is a substantially vertical rise or fall in voltage.

15. The apparatus according to claim 14 wherein said pulse generator applies a charge of a preselected polarity to one of said at least two electrodes and thereafter instantly reversing the polarity of said charge on said electrode.

16. The apparatus according to claim 14 wherein said pulse generator is adapted to produce electric pulses having a peak voltage in a range from about 10 to about 30 kVolts.

17. The apparatus according to claim 16 wherein said two electrodes are spaced apart an effective distance to give a pulse peak field strength in a range from about 15 to about 120 kVolts/cm.

18. The apparatus according to claim 12 wherein said first electrode is a cylindrical electrode and said second electrode is a substantially planar electrode with a hole therethrough, said first electrode being inserted through said hole in the second electrode, said hole having a diameter greater than a diameter of said cylindrical electrode to provide a gap between said first and second electrodes.

19. The apparatus according to claim 18 wherein said second electrode is disposed substantially halfway down the length of said first electrode.

20. The apparatus according to claim 19 wherein said effective gap is in a range from about 0.1 cm to about 1.0 cm.

21. A method for generating low-energy high-voltage instant-charge-reversal pulses, comprising:
   a) raising an a.c. line voltage through a step-up transformer, and then rectifying the stepped up voltage to produce a low voltage d.c. voltage which charges up the low voltage pulse capacitor ($C_1$) through an electrolytic capacitor bank ($C_0$) and an inductor ($L_1$); and
   b) discharging the low voltage capacitor bank through a thyristor and then raising the voltage through a high voltage pulse transformer to charge up a high voltage capacitor ($C_2$), discharging the high voltage capacitor through a thyratron to produce a pulsed electrical field between output electrodes connected to said thyratron.

22. The method according to claim 21 wherein said thyratron includes a thyratron driver connected thereto, said thyratron driver adapted to provide a train of wave pulses with effective voltage and pulse width and adjustable frequencies to trigger a grid-cathode gap of the thyratron and to provide a synchronous output for triggering a delay timer connected to said thyratron driver, said delay timer providing a triggering pulse for the thyristor with an effective time delay with respect to the triggering of the thyratron.

23. The method according to claim 21 including a pulse transformer connected between the delay timer and the thyrister for separating the thyristor from the triggering delay timer.

24. The method according to claim 23 wherein the a.c. line voltage is an output of a variac.

25. The method according to claim 21 wherein said effective voltage is 600 V and said effective pulse width is in a range of from about 1 μs to about 5 μs.

* * * * *